US00RE43894E

(19) United States
(12) Reissued Patent
Bankman et al.

(10) Patent Number: US RE43,894 E
(45) Date of Reissued Patent: Jan. 1, 2013

(54) METHOD AND APPARATUS FOR SEGMENTING SMALL STRUCTURES IN IMAGES

(75) Inventors: Isaac N. Bankman, Clarksville, MD (US); Tanya Nizialek, South Riding, VA (US)

(73) Assignee: The Johns Hopkins University, Baltimore, MD (US)

(21) Appl. No.: 13/314,021

(22) Filed: Dec. 7, 2011

Related U.S. Patent Documents

Reissue of:
(64) Patent No.: 7,106,893
Issued: Sep. 12, 2006
Appl. No.: 10/716,797
Filed: Nov. 18, 2003

U.S. Applications:
(63) Continuation of application No. 12/210,107, filed on Sep. 12, 2008, now Pat. No. Re. 43,152, which is a continuation of application No. 09/305,016, filed on May 4, 1999, now abandoned, application No. 13/314,021, which is a continuation of application No. 09/305,016.

(60) Provisional application No. 60/084,125, filed on May 4, 1998.

(51) Int. Cl.
*G06K 9/00* (2006.01)
*G06K 9/34* (2006.01)

(52) U.S. Cl. ..... 382/128; 382/164; 382/173; 382/177

(58) Field of Classification Search ..... 382/128, 382/129, 130, 131, 132, 133, 134, 164, 171, 382/173, 177, 179; 378/37, 62, 90, 92, 98.4, 378/98.6, 98.9; 600/300, 407, 410, 516; 128/916, 920, 922
See application file for complete search history.

(56) References Cited

U.S. PATENT DOCUMENTS 4,618,989 A 10/1986 Tsukune et al.
4,948,974 A 8/1990 Nelson et al.

(Continued)

FOREIGN PATENT DOCUMENTS

WO WO 99/57683 11/1999

OTHER PUBLICATIONS

International Search Report for International patent Application No. PCT/US99/09734; US Patent Office Oct. 18, 1999.

(Continued)

*Primary Examiner* — Abolfazl Tabatabai

(57) ABSTRACT

A method for segmenting a small feature in a multidimensional digital array of intensity values in a data processor computes an edge metric along each ray of a plurality of multidimensional rays originating at a local intensity extreme (local maximum or minimum). A multidimensional point corresponding to a maximum edge metric on each said ray is identified as a ray edge point. Every point on each ray from the local extreme to the ray edge point is labeled as part of the small object. Further points on the feature are grown by labeling an unlabeled point if the unlabeled point is adjacent to a labeled point, and the unlabeled point has a more extreme intensity than the labeled point, and the unlabeled point is closer than the labeled point to the local extreme. The resulting segmentation is quick, and identifies boundaries of small features analogous to boundaries identified by human analysts, and does not require statistical parameterizations or thresholds manually determined by a user.

20 Claims, 11 Drawing Sheets

U.S. PATENT DOCUMENTS

| | | | | | |
|---|---|---|---|---|---|
| 5,116,115 | A | | 5/1992 | Lange et al. | |
| 5,163,094 | A | | 11/1992 | Prokoski et al. | |
| 5,170,440 | A | | 12/1992 | Cox | |
| 5,185,809 | A | | 2/1993 | Kennedy et al. | |
| 5,239,591 | A | | 8/1993 | Ranganath | |
| 5,309,228 | A | | 5/1994 | Nakamura | |
| 5,345,941 | A | | 9/1994 | Rava et al. | |
| 5,361,763 | A | | 11/1994 | Kao et al. | |
| 5,365,429 | A | | 11/1994 | Carman | |
| 5,412,563 | A | | 5/1995 | Cline et al. | |
| 5,421,330 | A | | 6/1995 | Thirion et al. | |
| 5,452,367 | A | | 9/1995 | Bick et al. | |
| 5,457,754 | A | * | 10/1995 | Han et al. | 382/128 |
| 5,467,404 | A | | 11/1995 | Vuylsteke et al. | |
| 5,506,913 | A | | 4/1996 | Ibison et al. | |
| 5,572,565 | A | | 11/1996 | Abdel-Mottaleb | |
| 5,574,799 | A | | 11/1996 | Bankman et al. | |
| 5,627,907 | A | | 5/1997 | Gur et al. | |
| 5,646,742 | A | | 7/1997 | Clark et al. | |
| 5,651,042 | A | | 7/1997 | Dewaele | |
| 5,740,266 | A | * | 4/1998 | Weiss et al. | 382/128 |
| 5,768,333 | A | | 6/1998 | Abdel-Mottaleb | |
| 5,768,406 | A | | 6/1998 | Abdel-Mottaleb | |
| 5,825,910 | A | * | 10/1998 | Vafai | 382/132 |
| 5,835,620 | A | | 11/1998 | Kaplan et al. | |
| 5,854,851 | A | | 12/1998 | Bamberger et al. | |
| 5,982,916 | A | | 11/1999 | Kuhn | |
| 6,249,594 | B1 | | 6/2001 | Hibbard | |
| 6,535,623 | B1 | * | 3/2003 | Tannenbaum et al. | 382/128 |
| 6,738,500 | B2 | | 5/2004 | Bankman et al. | |
| 7,106,893 | B2 | | 9/2006 | Bankman et al. | |
| 7,155,067 | B2 | | 12/2006 | Jayant et al. | |

OTHER PUBLICATIONS

Liang Shen, Rangaraj M. Rangayyan, J. E. Leo Desautels, "Detection and Classifications of Mammographic Calcifications, "International Journal of Pattern Recognition and Artificial Intelligence, vol. 7, No. 6, pp. 1403-1416, (1993).

Michael Kass, Andrew Witkin, and Demetri Terzopolulos, "Snakes: Active Contour Models," International Journal on Computer Vision, pp. 321-331, (1998).

Laurent D. Cohen, "On Active Contour Models and Balloons," Computer Vision, Graphics, and Image Processing: Image Understanding, 53(2): pp. 211-218, (Mar. 1991).

Kei-Hoi Cheung, et al., "Isoreflectance Contours for Medical Imaging," IEEE Transactions on Biomedical Engineering, vol. 35, No. 12, pp. 1059-1063, (Dec. 1988).

Lawrence M. Lifshitz, et al., "A Multiresolution Hierarchical Approach to Image Segmentation Based on Intensity Extrema," IEEE Transactions on Pattern Analysis and Machine Intelligence, vol. 12, No. 6, pp. 529-540, (Jun. 1990).

S. Marshall, "Application of Image Contours to Three Aspects of Image Processing: Compression, Shape Recognition and Stereopsis," third International Conference on Image Processing and its Applications; 18-20, pp. 604-608 (Jul. 1989).

Shun Leung Ng, et al., "Automated Detection and Classification of Breast Tumors," Computers and Biomedical Research 25, pp. 218-237, (1992).

* cited by examiner

*G = d( P0, P ) - d ( P0, Pr ) = difference in distances from local maximum P0 to unlabeled point P and labeled point Pr

*G = d( P0, P ) - d ( P0, Pr ) = difference in distances from local maximum P0 to unlabeled point P and labeled point Pr Intensity array
622 Local intensity maximum 624 Ray edge pixels
642 Feature edge pixels 632 All labeled pixels Microcalcification candidates
715a 715b 715c Multi-tolerance segmentation edges
725a 725b 725c 735a 735b 735c
Active contour segmentation edges 745a 745b 745c
Hill climbing segmentation edges

METHOD AND APPARATUS FOR SEGMENTING SMALL STRUCTURES IN IMAGES

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 7,106,893. The reissue applications are application Ser. No. 13/314,021, which was filed on Dec. 7, 2011 (the present application), and application Ser. No. 12/210,107, which was filed on Sep. 12, 2008, and which issued as U.S. Pat. No. Re. 43,152 on Jan. 31, 2012. The present application is a continuation of application Ser. No. 12/210,107, which was filed on Sep. 12, 2008, which issued as U.S. Pat. No. Re. 43,152 on Jan. 31, 2012, and which was for the broadening reissue of U.S. Pat. No. 7,106,893; the present application is also for the broadening reissue of U.S. Pat. No. 7,106,893; thus, the present application is a broadening continuation reissue application.*

CROSS-REFERENCE TO RELATED APPLICATIONS

This application *is a continuation of U.S. patent application Ser. No. 12/210,107, filed Sep. 12, 2008, now U.S. Pat. No. Re. 43,152, which is an application for the reissue of U.S. Pat. No. 7,106,893, which issued Sep. 12, 2006 from U.S. patent application Ser. No. 10/716,797; and U.S. patent application Ser. No. 10/716,797* is a continuation of U.S. patent application Ser. No. 09/305,018, filed May 4, 1999, now abandoned, which claims the benefit of provisional *U.S.* patent application Ser. No. 60/084,125 filed on May 4, 1998, the entire disclosure of which is incorporated herein by reference. *This application is also an application for the reissue of U.S. Pat. No. 7,106,893, which issued Sep. 12, 2006 from U.S. patent application Ser. No. 10/716,797; and U.S. patent application Ser. No. 10/716,797 is a continuation of U.S. patent application Ser. No. 09/305,018, filed May 4, 1999, now abandoned, which claims the benefit of provisional U.S. Patent Application No. 60/084,125 filed on May 4, 1998.*

FIELD OF THE INVENTION

The present invention relates to data processing of intensity data arranged in a multidimensional array. More particularly, the invention relates to a method, an apparatus, and computer program products for rapidly segmenting multidimensional intensity data by which points in one or more small structures contained in the data are labeled.

BACKGROUND OF THE INVENTION

Digital imagery and other multidimensional digital arrays of intensity are routinely collected using digital sensors and arrays of charge coupled devices (CCDs). The resulting data arrays are analyzed to determine patterns and detect features in the data. For example, color images of a battle scene are analyzed to detect targets, and radiographs and sonograms of human and animal bodies are examined to detect tumors and other indications of injury or disease. As the number and complexity of these digital data arrays to be analyzed increase or the time required to perform the analyses decreases, automated and machine assisted analysis becomes more critical. Some statistically based automated procedures for detecting features in a multidimensional array are adequate when the feature encompasses many points in the array, i.e. when the feature is large, but fail to perform well as the feature to be detected becomes small. Some procedures perform well when tuned to a particular problem through experimental adjustment of many parameters, but such tuning may place an undue burden on time limited or experience limited personnel. Typical problems encountered with such automated analysis of small structures in multidimensional arrays are illustrated for the case of automatic detection of microcalcification candidates in mammograms.

Breast cancer has the highest incidence among all cancer types in American women, causing 1 woman in 8 to develop the disease in her lifetime. Every year, about 182,000 new cases are diagnosed with breast cancer and about 46,000 women die of this disease. The 5-year survival for women with breast cancer improves significantly with early diagnosis and treatment. To enable early detection, the American Cancer Society (ACS) recommends a baseline mammogram for all women by the age of 40, a mammogram approximately every other year between the ages of 40 and 50, and a mammogram every year after the age of 50. It is possible that the volume of mammography will become one of the highest among clinical X-ray procedures since more than 30 million women in the U.S. are above the age of 50 and 41% are known to follow the ACS guidelines.

Besides the volume problem, an additional difficulty of early detection of breast cancer in mammograms is the subtlety of the early signal. A microcalcification cluster, an early sign of breast cancer that may warrant biopsy, is commonly defined as three or more microcalcifications present in 1 $cm^2$ on a mammogram. These clusters are often difficult to detect due to their small size and their similarity to other tissue structures. The width of an individual microcalcification is less than 2 mm. The etiology of microcalcifications includes lobular, ductal or epithelial hyperplasia, secretion of calcium salts by epithelial cells, adenosis, as well as calcification of necrotic debris due to carcinoma. Up to 50% of breast cancer cases exhibit microcalcification clusters, and 20-35% of clusters in the absence of a mass are related to malignant growth. In many cases a cluster is the first and only sign that allows timely intervention.

The increasing pressure to interpret large numbers of mammograms and the subtlety of many early signs increase the likelihood of missing breast cancer. A reliable automated system that indicates suspicious structures in mammograms can allow the radiologist to focus rapidly on the relevant parts of the mammogram and it can increase the effectiveness and efficiency of radiology clinics. In the detection of breast cancer, false negatives may cause a delay in the diagnosis and treatment of the disease while false positives cause unwarranted biopsy examinations. Therefore, both sensitivity and specificity need to be maximized, with a relatively higher priority on sensitivity, which has a more vital role.

A common approach used for detecting microcalcifications in mammograms starts by segmenting candidate structures and subsequently applying feature extraction and pattern recognition to distinguish microcalcifications from background tissue among the candidates. In this process, segmentation plays an essential role since the quantitative features that represent each candidate structure, such as size, contrast, and sharpness, depend on the region indicated by segmentation. Furthermore, to process all possible candidate structures, a considerably large number of background structures need to be segmented, making fast segmentation desirable.

Several techniques for segmentation have been applied to microcalcifications. One segmentation technique is based on local thresholding for individual pixels using the mean pixel value and root mean square (rms) noise fluctuation in a selected region around the thresholded pixel. The threshold for a pixel is set as the mean value plus the rms noise value multiplied by a selected coefficient. A structure is segmented by connecting pixels that exceed the threshold. Both parameters that have to be selected, size of region and threshold coefficient, are critical to this method. If a microcalcification is close to another microcalcification or bright structure, the window used to compute the rms noise value around the first microcalcification will include the other bright structures, and the noise rms may be overestimated, thus setting the threshold too high. On the other hand, if the selected region is too small, it will not contain sufficient background pixels when placed on large microcalcifications.

Such a window size needs to be selected in a second segmentation algorithm as well, where local thresholding is used by setting a threshold for small square sub images. The threshold is based on an expected bimodal intensity distribution in a window of selected size that contains the sub-image to be segmented. If the distribution is not bimodal, then the threshold is set by using 5 different positions of the window each containing the sub-image to be segmented. The existence of a bimodal distribution in at least one window is essential for this algorithm.

Other segmentation methods start with seed pixels and grow a region by adding pixels. They also require selection of a window size and threshold parameters. The localized implementation of region growing depends on the selected window size and the threshold for absolute difference in gray level between the seed pixel and a pixel to be added to the region.

One segmentation algorithm uses several steps that include high-pass filtering, difference of Gaussinan filtering, four computations of the standard deviation of the image, a smoothing, an opening, as well as an iterative thickening process with two erosions, two intersections and a union operation in each iteration. More than ten parameters have to be selected, including widths of Gaussian distributions, threshold coefficients, and diameters of morphological filtering elements.

A segmentation algorithm that operates without parametric distribution models, local statistics windows, or manually adjustable thresholds is desirable.

A segmentation method that is fast is also important. Up to 400 films per day are routinely screened in busy radiology clinics. The automated analysis does not have to be applied on-line; however, it may be difficult to process large numbers of mammograms overnight if algorithms are not fast enough. Because the segmentation algorithm has to segment all candidate structures that may potentially be microcalcifications, its speed is especially relevant. Each film may have several thousand candidate structures that must be segmented.

The multi-tolerance segmentation algorithm of Shen et al. (L. Shen, et al. "Detection and Classifications of Mammographic Calcifications," International Journal of Pattern Recognition and Artificial Intelligence, vol. 7, pp. 1403-1416, 1993), does not use statistical models for local statistics, and its threshold is set automatically. This multi-tolerance, region growing approach uses a growth tolerance parameter that changes in a small range with a step size that depends on the seed pixel. The structure of interest is segmented multiple times with varying tolerance parameters, and in each segmentation, a set of three features is computed. The normalized vector differences in the feature set between successive segmentations are calculated and the segmentation with minimal difference is selected as the final one.

The active contours model of Kass et al. (Kass, M. et al. "Snakes: Active Contour Models," International Journal on Computer Vision, pp. 321-331, 1988), also provides segmentation without parametric statistical data models or windows for local statistics, but does rely on several user selected parameters that place some burden on the user. It has been used successfully to determine the boundaries of tissue structures in data such as ultrasound and MRI images of the heart, and MRI images of the brain, but it has not been applied to the segmentation of microcalcifications. The active contours model starts with an initial contour placed near the expected boundary and moves the contour iteratively toward the boundary by minimizing an energy function. The contour is modeled as a physical flexible object with elasticity and rigidity properties. Its dynamics, dictated by the balance between these internal properties and external forces that depend on the image data, satisfy the Euler equations and minimize the corresponding energy function. An active contour that is initiated as a closed curve remains so during iterations and its smoothness can be adjusted by the choice of parameters.

What is needed is a segmentation method and apparatus without statistical models, local statistics, or thresholds to be selected manually, and with significantly lower computational complexity compared to the multi-tolerance and active contours methods, for enhanced speed.

In particular, what is needed is a method and apparatus to segment pixels in an image, such as a mammogram, containing a plurality of extra dark or extra bright objects just a few pixels in extent, that gives edges similar to those selected by an expert, but does so with fewer computations and with fewer manually adjustable parameters than conventional segmentation methods and equipment.

SUMMARY OF THE INVENTION

Therefore it is an object of the present invention to provide segmentation for small features in multidimensional data which defines small feature edges that correspond closely to those selected by an analyst but does so with less complexity than the above known methods.

It is another object of the present invention to provide a data processing apparatus that more rapidly provides small feature edges that correspond closely to those selected by an analyst.

It is another object of the present invention to provide computer program products that more rapidly provide small feature edges that correspond closely to those selected by an analyst.

It is another object of the invention to identify microcalcifications in a mammogram.

These and other objects and advantages of the present invention are provided by a method for segmenting a small feature in a multidimensional digital array of intensity values in a data processor. Each small feature includes a local intensity extreme, such as an intensity maximum. An edge metric is computed along each ray of a plurality of multidimensional rays originating at the local intensity extreme. A multidimensional edge point is identified corresponding to a maximum edge metric on each ray. Every point on each ray from the local extreme to the ray edge point is labeled as part of the small feature. The labeling is then spread to an unlabeled point following a hill climbing procedure requiring that the unlabeled point be adjacent to a labeled point, have a similar or more extreme intensity than the labeled point, and be closer than the labeled point to the local extreme.

In another embodiment, the multidimensional array is a digital image, and each point is a pixel. In another embodiment, the digital image is a digitized mammogram and the small feature is a microcalcification candidate. In the latter embodiment, microcalcification candidates are satisfactory segmented in fewer operations than with conventional segmentation methods.

In another aspect of the invention, a data processing apparatus segments a small feature in a multidimensional digital array of intensity values. The apparatus includes an input for inputting a plurality of intensity values arranged along regular increments in each of a plurality of dimensions and a memory medium for storing the plurality of intensity values as a multidimensional digital array. The apparatus includes a processor configured to detect a local intensity extreme in the multidimensional digital array, to identify points along a plurality of rays originating at the local intensity extreme, and to identify one ray edge point on each ray. The ray edge point is associated with a maximum edge metric along the ray. The processor is also configured to label the points in the array that are part of the small features. Each point on each ray from the local intensity extreme to the edge point is labeled, as is an unlabeled point adjacent to a labeled point if the unlabeled point has a more extreme intensity than the labeled point and the unlabeled point is closer than the labeled point to the local extreme. Labeling continues until no more unlabeled points can be labeled. The apparatus also includes an output for providing the labeled points for subsequent processing.

In another aspect of the invention, a computer program product is provided for segmenting a small feature in a multidimensional array of intensities using a computer. The computer program product includes computer controlling instructions for configuring a computer to compute an edge metric along each ray of a plurality of multidimensional rays originating at a local intensity extreme. The instructions also identify a ray edge multidimensional point corresponding to a maximum edge metric on each ray. The program also labels every point on each ray from the local extreme to the ray edge point, and then labels an unlabeled point if the unlabeled point is adjacent to a labeled point and the unlabeled point has a more extreme intensity than the labeled point, and the unlabeled point is closer than the labeled point to the local extreme. In one embodiment, the instructions are stored in a computer readable memory device. In another embodiment, the instructions are transmitted as electronic signals on a communications line.

The foregoing and other features, aspects and advantages of the present invention will become more apparent from the following detailed description of the present invention when taken in conjunction with the accompanying drawings.

BRIEF DESCRIPTION OF THE DRAWINGS

The preferred and example embodiments of the present invention are described with reference to the Drawings in which.

DETAILED DESCRIPTION OF THE PREFERRED EMBODIMENT

Figure 1A:
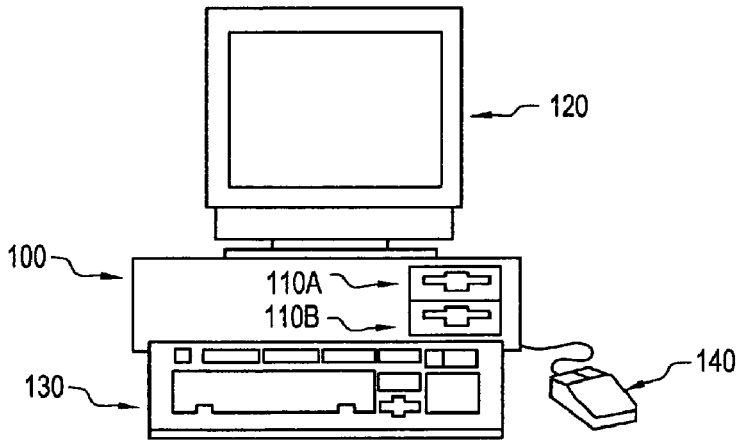
FIG. 1A is a perspective view of the external features of a computer apparatus suitable for one embodiment of the present invention.

The principles of the present invention will be described next, detailed in terms of preferred and example embodiments with reference to the accompanying drawings. Whenever possible, the same reference numbers will be used throughout the drawings to refer to the same or like parts.

The explanations of the detailed embodiments are by way of example only and are not meant to limit the scope of the invention. The invention applies to identifying small structures in any multidimensional array of regularly spaced intensity values. Here intensity is used in a generic sense representative of measured data values in general, and is not confined to density of optical energy. Examples of such multidimensional arrays include gray-scale digital images in which intensity values are regularly spaced in two dimensions, often called rows and columns or y and x, such as the mammogram described in the preferred embodiment. In this kind of arrangement, each digital image element is a picture element called a pixel. Elevation maps are two dimensional arrays of height data, where height is the "intensity." Other examples of multidimensional arrays include color images which can be represented as three-dimensional arrays of intensity where the third dimension is color. Typically, the array would have intensity at only three points in the color dimension, for example, a red intensity, a blue intensity and a green intensity. Gray-scale video clips can also be considered three-dimensional arrays, where each video image frame is two-dimensional and the third dimension is time. By the same token, color video clips can be considered four-dimensional where the four dimensions are row, column, color and time. Other examples include medical imagery where two-dimensional cross sections of a human body are assembled at several positions from head to toe. In this case the third dimension is height through the subject. By extension, such three-dimensional looks can be repeated at uniform intervals of time, making time the fourth dimension. Thus the descriptions that follow apply not only to gray scale images of the preferred embodiment, but to multidimensional arrays of digital data.

A multidimensional point in a multidimensional digital array is located by the index of the point in each of the dimensions. Letting D represent the number of dimensions, the location of a multidimensional point P in a multidimensional array can be specified uniquely by a set containing D indexes as coordinates, $\{I_1, I_2, I_3, \ldots I_D\}$. Where there are only two dimensions, it is common to refer to $I_1$ as the x coordinate and to refer to $I_2$ as the y coordinate. There is an implied limit to the number of allowed positions in each dimension of a finite array. Letting $L_i$ represent the maximum number of locations in the i-th dimension of the digital data array, each index can vary from one to $L_i$, inclusive. That is:

$$1 \leqq I_i \leqq L_i. \tag{1}$$

The distance, d, between any two multidimensional points, $P_a$ and $P_b$, with different indices $\{a_1, a_2, a_3, \ldots a_D\}$ and $\{b_1, b_2, b_3, \ldots b_D\}$, can be defined as the square root of the sum of the squares of the differences in their indices. That is, $$d(P_a, P_b) = d(P(a_1, a_2, \ldots, a_D), P(b_1, b_2, \ldots, b_D)) \tag{2}$$

$$= \sqrt{[(b_1 - a_1)^2 + (b_2 - a_2)^2 + \ldots + (b_D - a_D)^2]}$$

The intensity, f, varies with position in the multidimensional array and may be represented by the symbol f(P). The intensity f at each multidimensional point can be a single value, also called a scalar quantity. Alternatively, the intensity can be a vector of several values, e.g., f(P)={f1(P), f2(P), f3(P)}. For example, the three-color image can be treated as a three-dimensional array or can be treated as a two dimensional image with a three element vector intensity. In this terminology, the vector elements of the intensity are not used in the calculation of distance using Equation 2. Instead, the magnitude of intensity at point P could be any vector magnitude convention such as the square root of the sum of the squares of the vector components or the sum of the absolute values of the vector components. Similarly, the difference in intensity between two points $P_a$ and $P_b$ would be given by the magnitude of the difference in the components using any conventional method.

Thus, though the preferred embodiment is described in which the digital data array is an image having two dimensional pixels, each pixel having a scalar image intensity, the method can readily be extended to multiple dimensions using the above relationships. In the following, each pixel P has a first coordinate represented by x and a second coordinate represented by y and an intensity represented by f(P) or f(x,y). Separate pixels are designated by separate subscripts.

Though the invention applies to any imagery, the preferred embodiments segment two-dimensional images with a gray-scale intensity representative of a [mamnmogram] *mammogram*. Other two dimensional imagery which the present invention can segment include imagery of military scenes in which the intensity is responsive to the presence of targets of a firing system, such as vehicles to be fired upon by a missile.

The invention is related to finding small objects in a multidimensional array. In this context small means objects affecting the intensity in several points in one dimension of the array but not many thousands of points in each dimension. Other, statistical and textural segmentation procedures, for example, are expected to be more useful as the number of points in a feature increases. It is characteristic of microcalcifications in mammograms and distant targets in military scenarios that only several pixels are contained in the object to be segmented. It is also anticipated that many other features to be detected in radiographs and sonograms of biological bodies also involve only several pixels. The present invention is expected to perform especially well for these applications.

The methods and procedures discussed herein are intended to be performed by data processing systems or other machines. Though described in terms that can be interpreted to be performed by a human operator, such performance is neither required nor likely to be desirable. Multiple tedious computations with high accuracy are required that are unsuitable for practical implementation by human beings. Also, the invention can be implemented in computer or other hardware, the structure of which is evident from the following descriptions.

Also herein, the procedures will be described as the manipulation of values, symbols, characters, numbers, or other such terms. Though such terms can refer to mental abstractions, herein they are used as convenient expressions for physical signals such as controllable chemical, biological, and electronic and other physical states that can be used to represent the values, symbols, characters, numbers, or other such terms.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives that might be accommodated by the computer system. Typically these would include a floppy disk drive such as 110A, a hard disk drive (not shown externally) and a CD-ROM drive indicated by slot 110B. The number and type of drives vary, typically, with different computer configurations. The computer has a display 120 upon which information is displayed. A keyboard 130 and mouse 140 are typically also available as input devices.

Figure 1B:
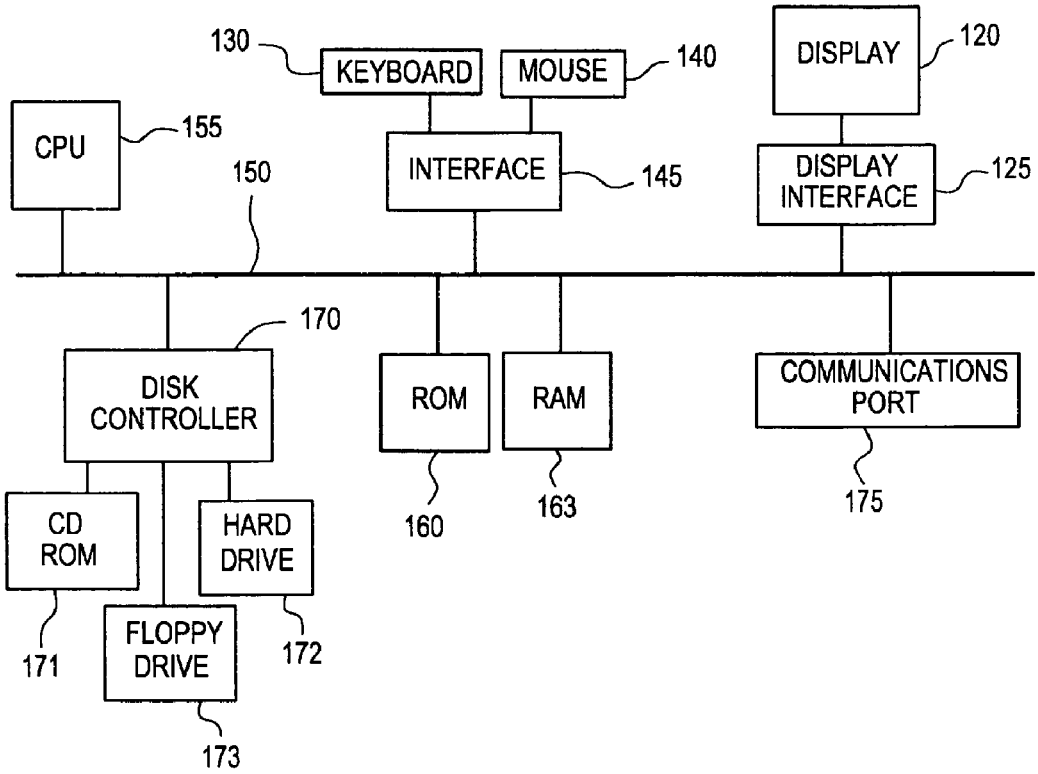
FIG. 1B is a block diagram of a computer apparatus that can be configured according to one embodiment of the present invention.

FIG. 1B illustrates a block diagram of the internal hardware of the computer of FIG. 1A. A bus 150 serves as the main information highway interconnecting the other components to the computer. CPU 155 is the central processing unit of the system, performing calculations and logic operations required to execute programs. Read-Only-Memory 160 and Random-Access-Memory 165 constitute the main memory of the computer. Disk controller 170 interfaces one or more disk drives to the system bus 150. These disk drives may be floppy disks drives, such as 173, internal or external hard drives, such as 172, or CD-ROM or DVD (digital video disk) drives such as 171. A display interface 125 interfaces a display 120 and permits information from the bus to be viewed on the display 120. Communications with external devices can occur over communications port 175.

Figure 1C:
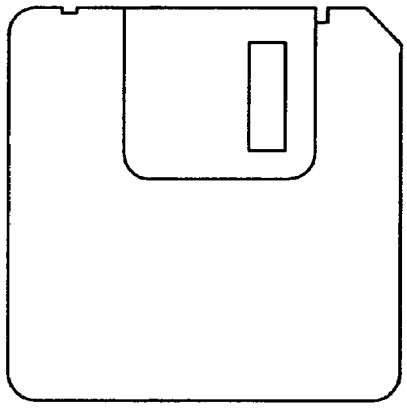
FIG. 1C is a perspective view of a sample memory medium for storing instructions to configure a computer according to another embodiment of the present invention.

FIG. 1C illustrates an exemplary memory medium which can be used with drives such as 173 in FIG. 1B or 110A in FIG. 1A. Typically, memory media such as a floppy disk, or CD-ROM, or DVD, will contain the program information for controlling the computer to enable the computer to perform its functions in accordance with the invention.

Figure 1D:
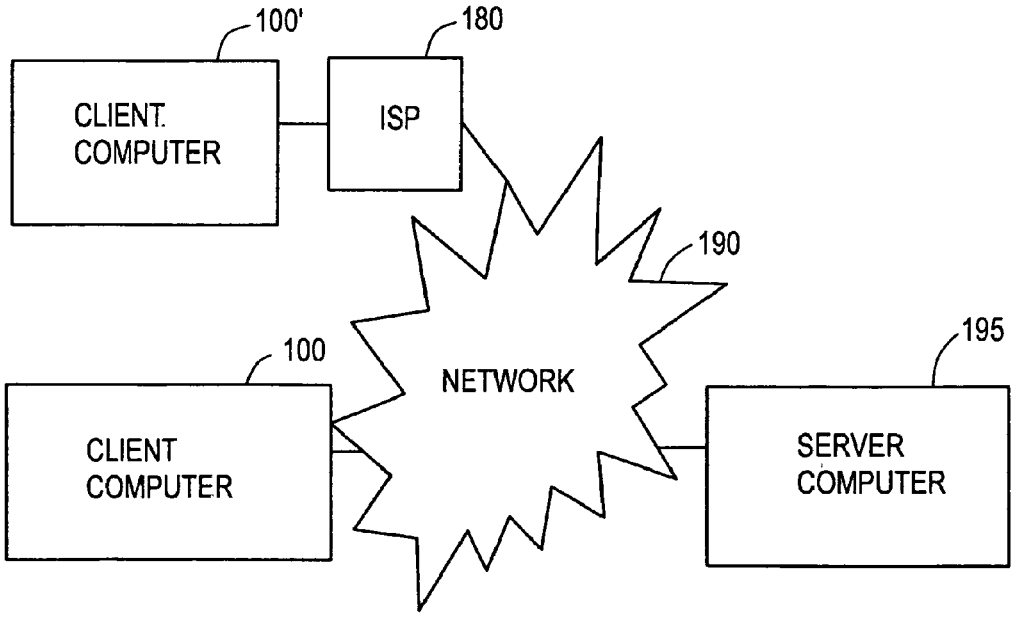
FIG. 1D is a block diagram of a network that can transmit electronic signals that configure a computer according to still another embodiment of the present invention.

FIG. 1D is a block diagram of a network architecture suitable for carrying data and programs over communication lines in accordance with some aspects of the inventions. A network 190 serves to connect a user computer or client computer 110 with one or more servers such as server 195 for the download of program and data information. A second user on a second client computer 100' can also connect to the network via a network service provider, such as ISP 180.

In general, small objects in images may have an intensity level that is either lower or higher than a surrounding background. An intensity maximum with levels higher than the background is called a local maximum, and an intensity minimum with intensity levels below the background is called a local minimum. Both maximum and minimum are encompassed by the term intensity extreme. Thus, in general, the target objects in an image or multi-dimensional array encompass intensity extremes. Both are capable of being segmented according to the present invention. For the sake of serving as an example, the following description generally considers the preferred embodiment in which microcalcifications are evident as local maxima in intensity, and the method will be called a hill climbing method; however, segmenting a local minimum is also anticipated using the hill climbing method. In the following discussion, when a first point has an intensity equaling the intensity of the local extreme or between the intensity of the local extreme and the intensity of a second point, the first point is said to have a more extreme intensity than the second point.

Figure 2A:
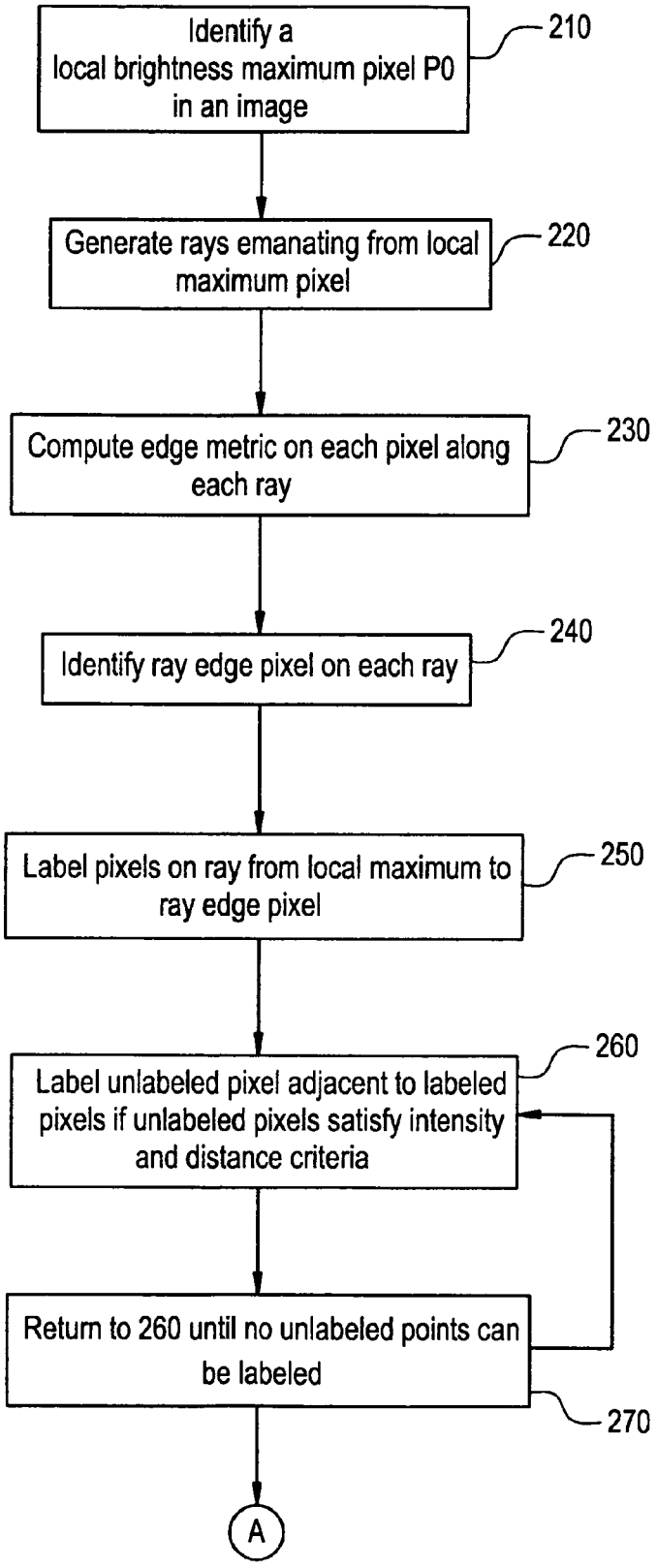
FIG. 2A is a flow diagram for a method according to yet another embodiment of the present invention.
Figure 3:
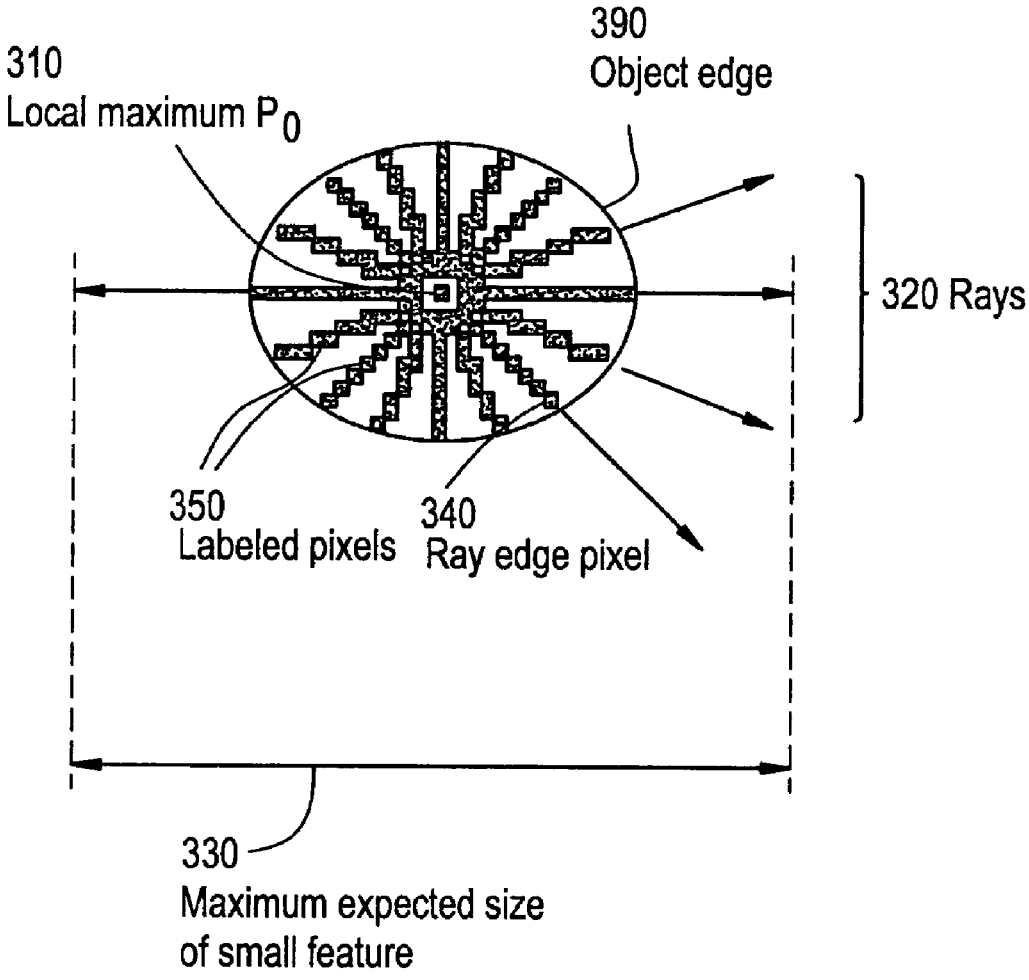
FIG. 3 is a schematic diagram of a local maximum, rays and edges that results from steps 210 through 250 of FIG. 2.

FIG. 2A shows the method according to one embodiment of the present invention. A local brightness maximum, characteristic of a microcalcification, is identified at pixel $P_0$ in an image at step 210. Next, a plurality of rays is defined that emanate from that local maximum pixel $P_0$ as illustrated in step 220. FIG. 3 illustrates five sample rays 320 emanating from a local maximum 310. Referring again to FIG. 2A, an edge metric is computed for each pixel along each ray in step 230. Then in step 240, a ray edge pixel on the ray is identified based on a maximum edge metric. Then the pixels on the ray from the local maximum to the ray edge pixel, inclusive, are labeled as belonging to the object or feature in step 250. Additional pixels belonging to the feature are labeled if they are adjacent to a labeled pixel and if the unlabeled pixel satisfies intensity and distance criteria described later. These criteria implement the unique hill climbing procedure of the present invention. This growth of labeled pixels is indicated by step [216] *260*. In step 270, every unlabeled pixel next to a labeled point is examined using the criterion in step 260 until no further points can be labeled.

Figure 2B:
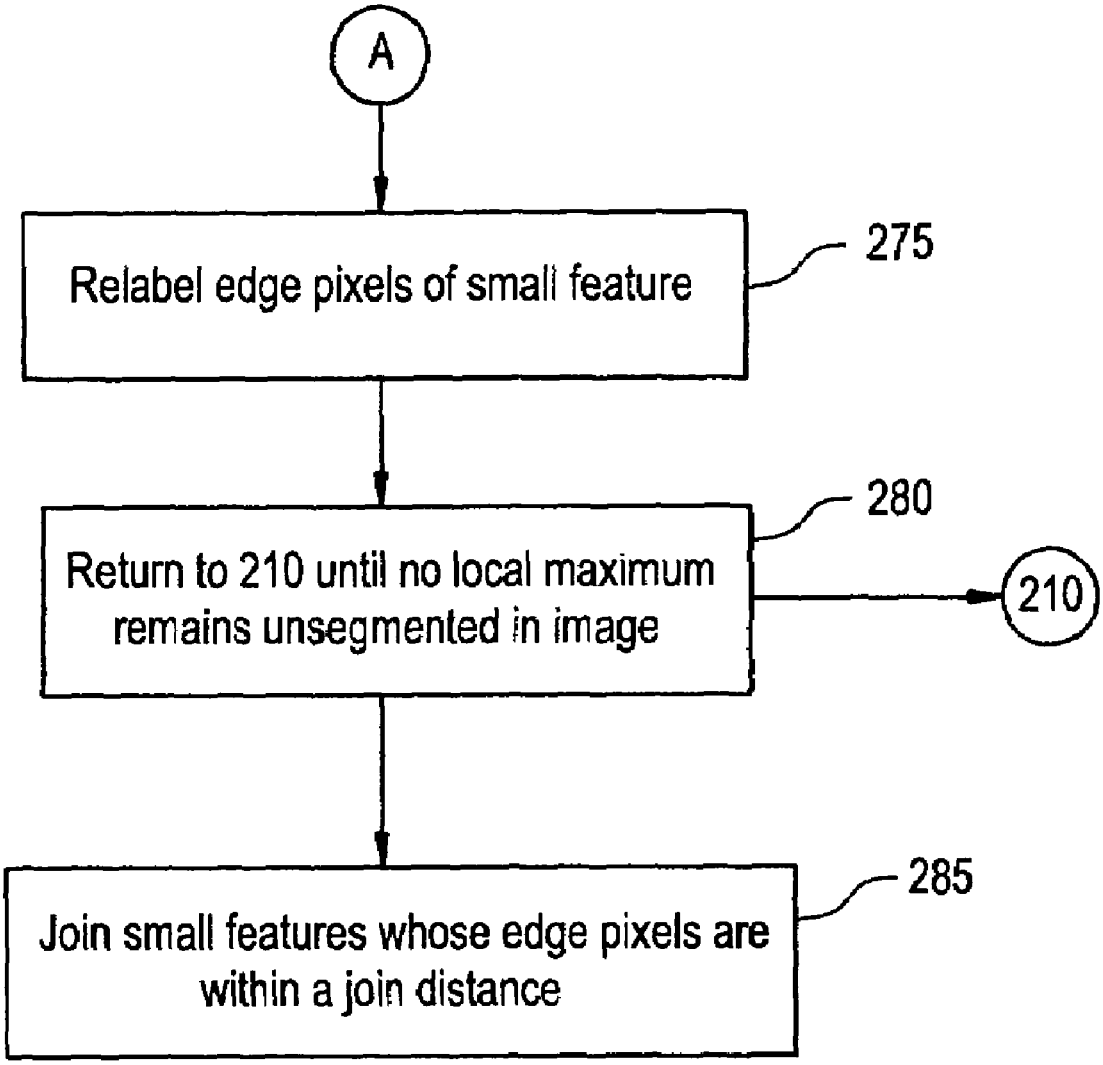
FIG. 2B is a flow diagram following step 270 of FIG. 2A according to a further embodiment of the present invention.

FIG. 2B shows steps that follow step 270 in another embodiment of the present invention. Here each of the labeled pixels is checked in step 275 and those labeled pixels adjacent to an unlabeled pixel are relabeled as an edge pixel of the small feature. This completes the labeling associated with one of the small features in the image; and, in step 280, control is returned to step 210 until no local maximum remains unlabeled or unsegmented in the image. In yet another embodiment of the invention, small features identified in the image can be joined in step 285 if those pixels are within a joint distance. Additional detail regarding the steps shown in FIGS. 2A and 2B are provided with reference to FIGS. 2C through 5.

According to the present invention, the segmentation is based on the experience that, in a given array, the edge of a small feature to be segmented is a closed contour around a local intensity extreme pixel $P_0$. In the preferred embodiment, the local intensity extreme is selected as the pixel with an extreme intensity (maximum or minimum) in a region the size of the expected size of the small feature or object. The region should have the same number of dimensions as the data array, just fewer pixels. In other words, the region is defined as a sub-array of the multidimensional size equal to the expected size of the feature. In the case of mammograms, this sub-array is a square that is about 100 pixels in x and 100 pixels in y when the resolution of the image is about 25 microns per pixel. To avoid selecting local extremes that are insignificant, the extreme is also required to achieve a certain absolute value—above a pre-set bright threshold in the case of a local maximum, or below a pre-set dark threshold in the case of a local minimum.

A pixel P on a ray is considered to be on the edge of a small object if it provides a maximum edge metric in a line search on a ray originating from the local extreme pixel and moving in a direction k. The edge metric may be defined as the change in intensity with each succeeding pixel in the direction k or by a Sobel operator centered on the pixel, or by any known edge metric. However, in the preferred embodiment with a local maximum, a ray edge pixel is found that more closely corresponds to that selected by expert analysis when the edge metric is a slope defined according to equation 3.

$$S(P) = \frac{f(P_0) - f(P)}{d(P_0, P)} \tag{3}$$

For each pixel P around this local maximum $P_0$ the slope has a value S(P) where $f(P_0)$ is the intensity, e.g., the gray scale value, at the local maximum pixel $P_0$, and f(P) is the intensity at pixel P, and $d(P_0, P)$ is the distance between the local maximum pixel $P_0$ and the pixel P. In general, to extend to the case where $P_0$ is a local minimum, the absolute value of the numerator is used. The notation $d(P_1,P_2)$ here indicates the absolute value of the distance between two points $P_1$ and $P_2$. Let $P_n$ represent the nth pixel along a ray in a direction k. The n varies from 0 at the local maximum to N−1 at the Nth consecutive pixel along the ray. The number N is not a critical choice as long as it is larger than the number of pixels expected to lie between the local maximum and the edge of the largest structures of interest. Referring to FIG. 3, N should be the number of pixels extending half the length of the arrow 330 indicating the maximum expected size of a small feature, for example. Among the pixels $P_n$, the pixel at which $S(P_n)$ is maximal is considered to be an edge point in that direction and is denoted by e(k). In the preferred embodiment, the ray search is applied in many equally spaced directions originating from the local maximum pixel, resulting in a set of ray edge pixels e(k) where k varies from 1 to K, the number of directions for which rays are computed. In the preferred embodiment, as shown in FIG. 3, K equals 16. For each direction k, the edge pixel and all pixels between the local maximum and the edge pixel e(k) are labeled as belonging to the object associated with the local maximum pixel $P_0$. This results in K radial lines of labeled pixels 350, as shown in FIG. 3. These labeled pixels are used as seeds or reference pixels for growing a region to identify all the pixels of the object.

Figure 4:
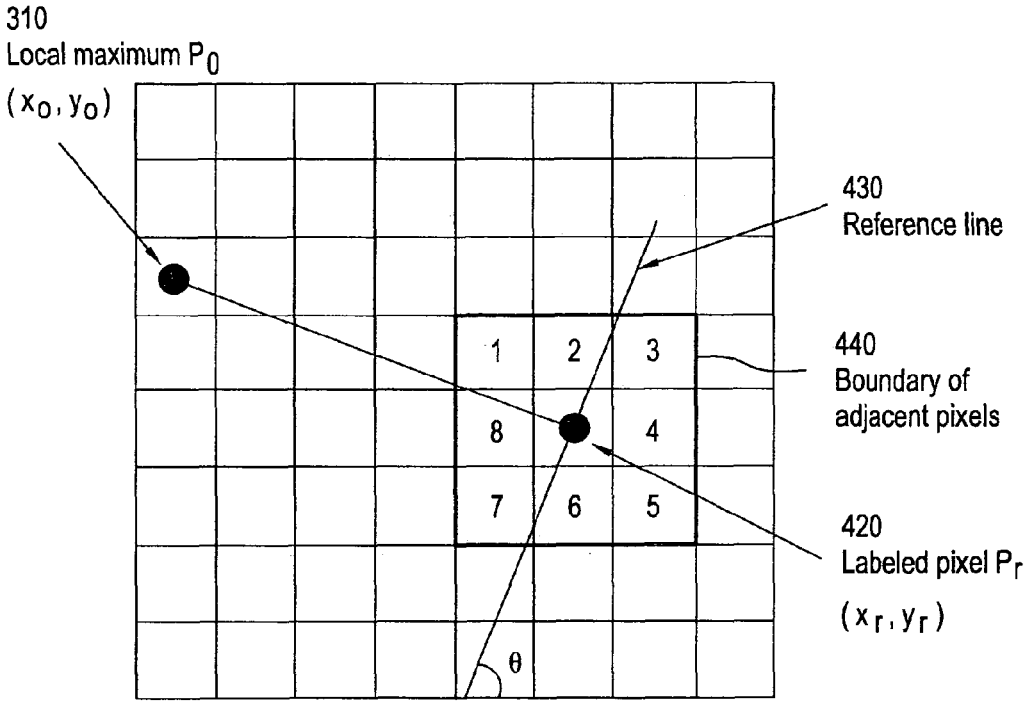
FIG. 4 is a schematic diagram of a local maximum, a labeled pixel, adjacent pixels, and a reference line according to one criteria for one embodiment of step 260 of FIG. 2.

To identify all pixels lying within a contour including the edge points e(k), the region should grow essentially on pixels with more extreme intensity (e.g., increasing intensity) and toward the local extreme (e.g., local maximum). From any labeled pixel taken as a reference point, the region can grow to an adjacent unlabeled pixel if this new pixel satisfies some particular conditions. In the case of data arrays with more than two dimensions, adjacent points to a labeled point are those whose indices are all within one of the corresponding indices of the labeled point. Referring to FIG. 4, the reference pixel is the labeled pixel 420 and the eight adjacent pixels are numbered clockwise from the diagonally upper left pixel as pixel 1 through 8. These eight pixels are considered eight-connected with the labeled pixel 420. A subset of these adjacent pixels is the four-connected set of pixels to which pixels labeled 2, 4, 6 and 8 belong. With respect to the reference or labeled pixel 420, an eight-connected adjacent or neighbor pixel is checked. If the neighbor pixel is already labeled, it has already been determined that the neighbor pixel is on the object. If the neighbor pixel P is not labeled, then it has to satisfy the following conditions to be labeled.

IF $f(P) \geqq f(P_r)$ then P must be in a position that constitutes a step from $P_r$ toward $P_0$.

IF $f(P) < f(P_r)$, then P should be closer to $P_0$ than $P_r$ is to $P_0$ by more than a minimum distance called an inclusion tolerance distance.

All pixels labeled during the process are used as reference pixels. The method stops when no pixel can be appended as shown in step 270 of FIG. 2A. The step for labeling unlabeled pixels is illustrated in FIG. 2A as step 260.

The intensity and distance criterion referred to in step 260 are now described with reference to FIGS. 2C and 2D, which each show one of the two alternative criteria used in the present hill climbing method and apparatus. In both these figures, the first condition checked is the intensity f(P) of the unlabeled point P compared to the intensity $f(P_r)$ at the reference pixel $P_r$, as shown in step 262.

Most microcalcifications have an intensity that decreases monotonically from the local maximum toward the edges. However, in some cases, this may not be true, and the growth toward the local maximum may need to include new pixels that have lower values or less extreme values than their labeled referenced pixels. As long as this is done strictly toward the local extreme, growth in an unwanted direction is avoided. That is, if the unlabeled pixel P is much closer to the local maximum (or minimum) than is the labeled referenced pixel $P_r$, then the unlabeled pixel P is considered engulfed by the object and is labeled even if its intensity f(P) is less extreme than $f(P_r)$. The distance by which the unlabeled point must be closer than the labeled point to be engulfed by the object is called the inclusion tolerance distance. In this and the following discussions, the difference in distances between the labeled and unlabeled points to the local maximum $P_0$ is represented by G given in Equation 4.

$$G = d(P_0, P) - d(P_0, P_r) \tag{4}$$

When the unlabeled pixel P is closer to the local maximum $P_0$ than the unlabeled pixel $P_r$, then G is negative. Therefore, the negative of G is compared to the inclusion tolerance to determine if the unlabeled pixel is close enough to the local extreme to be engulfed, as shown in step 263 of FIGS. 2C and 2D. In the preferred embodiment, the inclusion tolerance is one pixel. Thus, lower intensity pixels closer to the local maximum than the already labeled point $P_r$ by more than one pixel are close enough to be labeled. That is, a new pixel P with intensity f(P) less extreme than the intensity $f(P_r)$ of the referenced pixel $P_r$ is appended to the region if its distance to the local extreme is such that $-G$ is $\geqq$ the inclusion tolerance distance, as shown in step 265 of FIGS. 2C and 2D. If the unlabeled pixel with less extreme value is less than the inclusion tolerance closer to the local extreme or is farther from the local extreme, then the unlabeled pixel is not labeled, as shown in step 265 of FIGS. 2C and 2D.

Figure 2C:
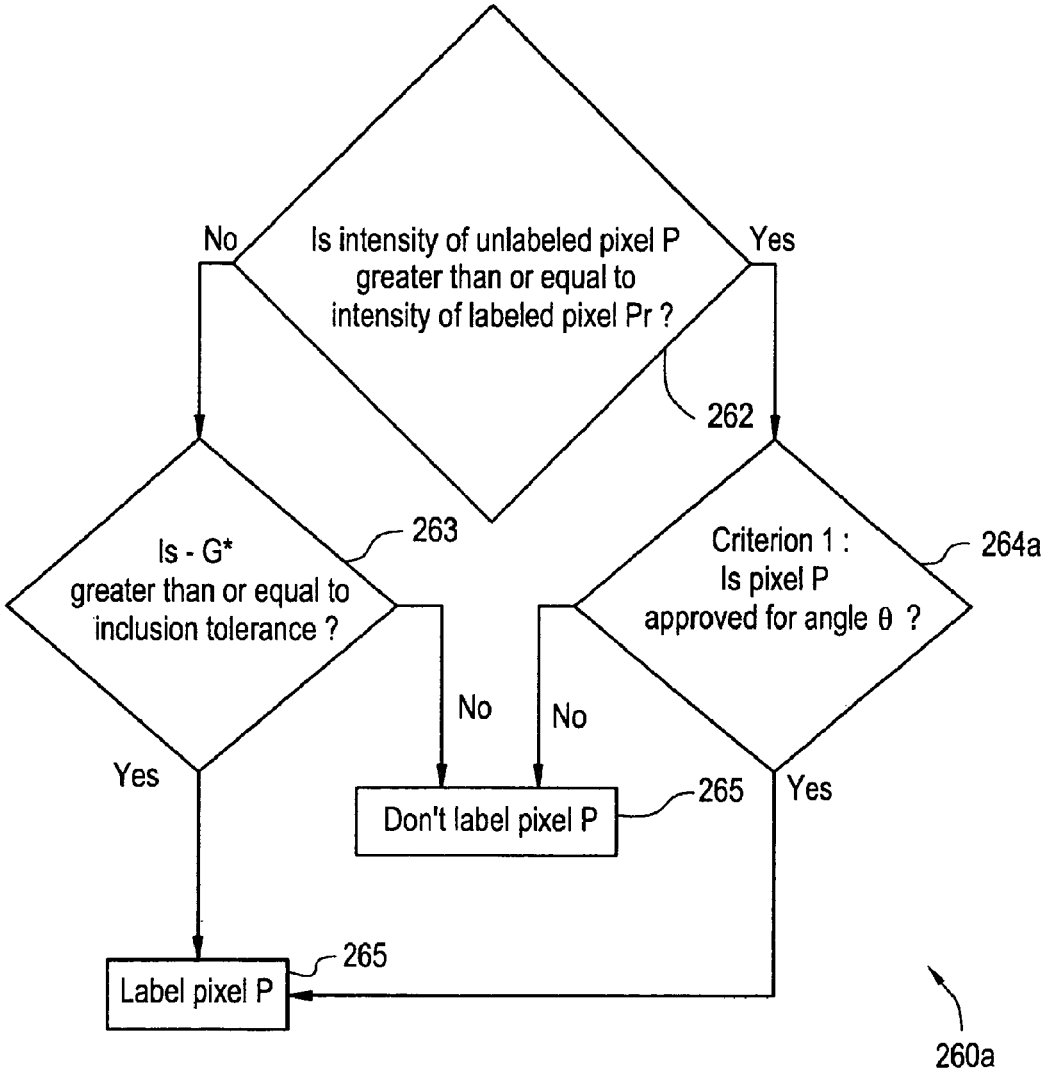
FIG. 2C is a flow diagram for details of step 260 of FIG. 2A according to still another embodiment of the present invention.
Figure 2D:
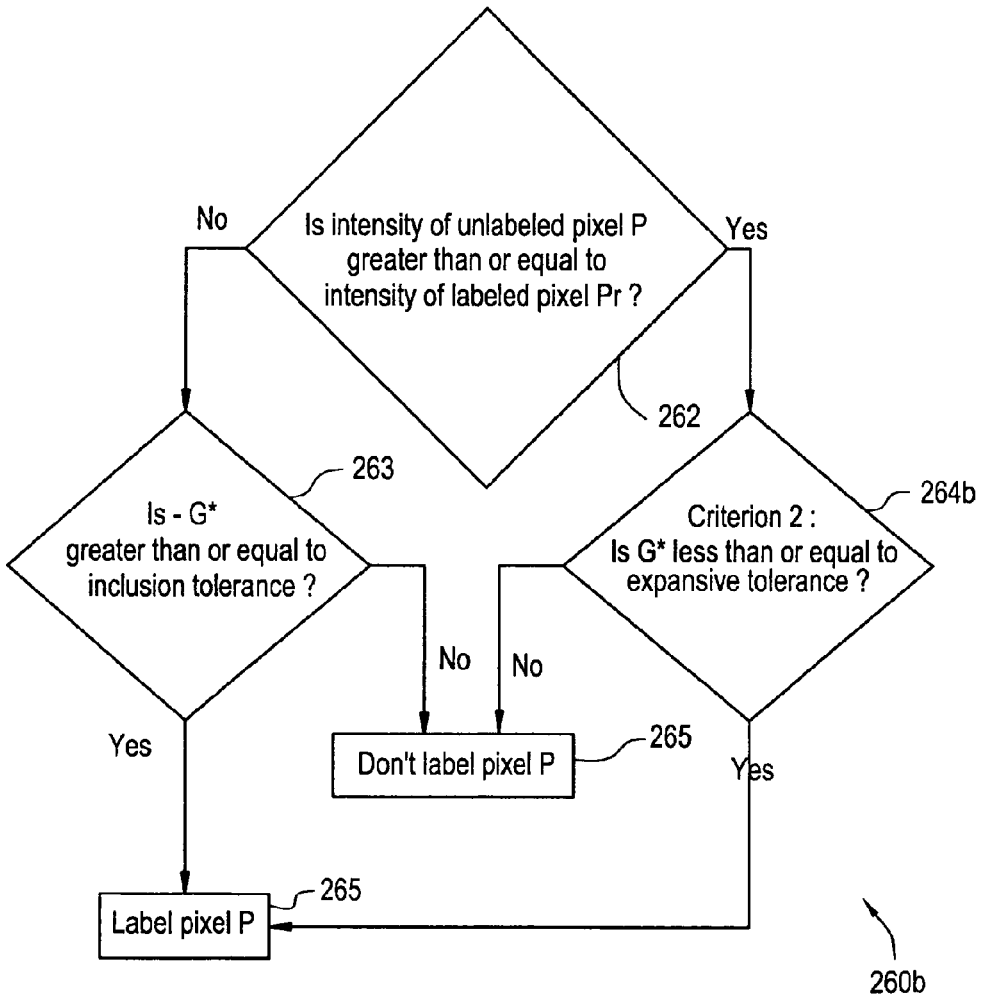
FIG. 2D is a flow diagram for an alternative detail for step 260 of FIG. 2A according to yet another embodiment of the present invention.

The other branch from step 262 in FIGS. 2C and 2D is followed when the adjacent pixel P that is unlabeled has an intensity that is greater than or equal to the intensity of the labeled pixel $P_r$. This corresponds to the condition in the case of a local minimum that the unlabeled pixel has a lower intensity than the labeled pixel $P_r$. That is, the "yes" branch is followed from box 267, in general, if the unlabeled pixel P has an intensity that is no less extreme than the intensity at the labeled pixel $P_r$. Each of two different criteria can be used to determine whether the unlabeled pixel P is in a position that constitutes a step from the labeled pixel $P_r$ toward the extreme pixel $P_0$.

The first criterion, Criterion 1, is indicated in FIG. 2C and step 264a and is based on the angle of the line perpendicular to the line segment connecting the local extreme $P_0$ with the reference pixel $P_r$. The line perpendicular to the segment connecting the local extreme to the labeled pixel is called the reference line 430 and is shown in FIG. 4. For arrays of more than two dimensions, the reference would be a surface with a number of dimensions at least one dimension less than the multidimensional array. The numbered pixels of FIG. 4 are approved for appending to the small feature if they fall within the list of approved pixels listed in Table 1 for the quadrant in which the angle θ varies from 0-90°. The angle θ

TABLE 1

Criterion 1 for First Quadrant.

| xr | yr | θ | Approved Pixels |
|---|---|---|---|
| $x_r = x_0$ | $y_r < y_0$ | 0° | 1, 2, 3, 4, 8 |
| $x_r > x_0$ | " | $0 < \tan\theta \leqq 1/3$ | 1, 2, 3, 4, 8 |
| " | " | $1/3 < \tan\theta < 1$ | 1, 2, 3, 8 |
| " | " | $\tan\theta = 1$ | 1, 2, 3, 7, 8 |
| " | " | $1 < \tan\theta \leqq 3$ | 1, 2, 7, 8 |
| " | " | $3 < \tan\theta < \infty$ | 1, 2, 6, 7, 8 |
| " | $y_r = y_0$ | 90° | 1, 2, 6, 7, 8 |

between the reference line 430 and the x-axis is also shown in FIG. 4. The first two columns of Table 1 show the relationship between the coordinates of the reference pixel $x_r$ and $y_r$ of $P_r$ and their relationship to the coordinates $x_0$ and $y_0$ of the local maximum $P_0$. For different values of the angle θ or its tangent, tan θ, different of the numbered pixels in FIG. 4 are approved. Table 1 captures the condition that the unlabeled pixel P and the local maximum $P_0$ must lie on the same side of the reference line 430. Among the eight pixels that surround a reference pixel, only some will meet the spatial criterion of Criterion 1, depending on the angel θ of the reference line. The angle θ is measured positive counterclockwise from the x-axis. The allowable pixels for values of θ in the other three quadrants are obtained in a symmetrical manner. An extended table would have to be drafted for data arrays of greater than two dimensions.

Figure 5:
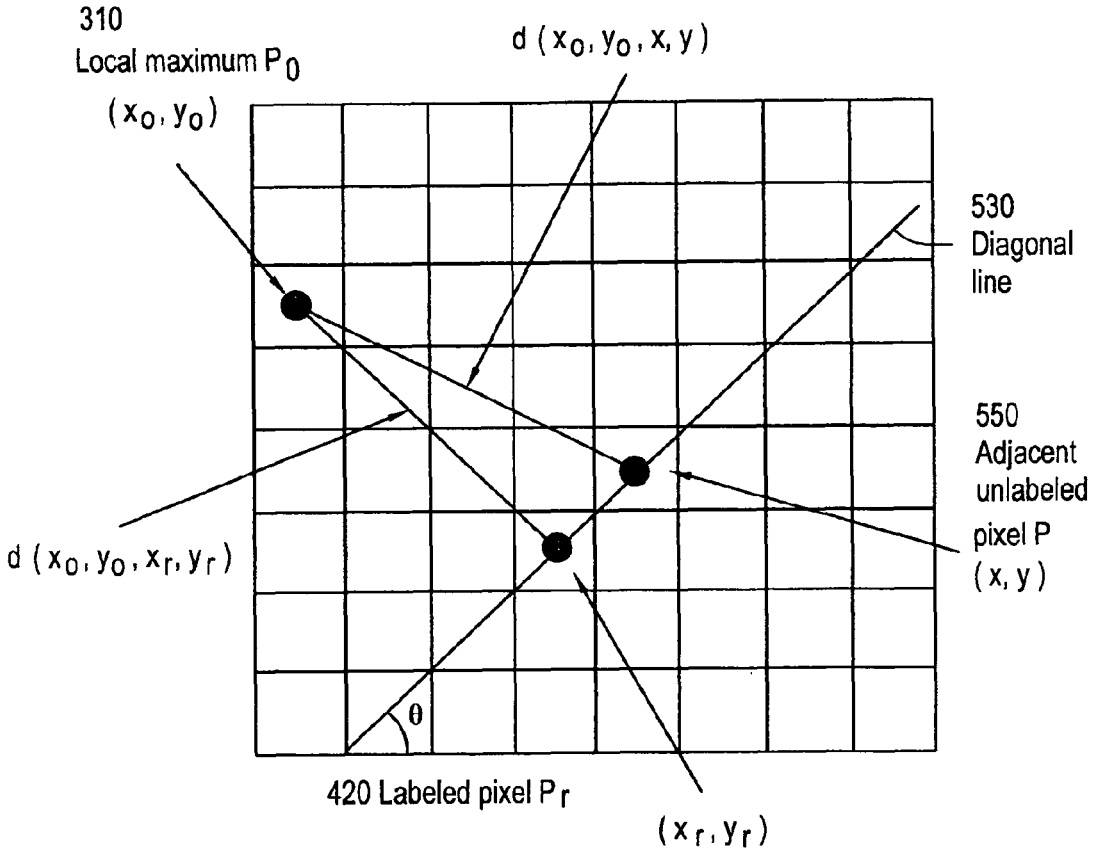
FIG. 5 is a schematic diagram of a local maximum, a labeled pixel, and an adjacent pixel according to a criteria for another embodiment of step 260 of FIG. 2.

[As] *Referring to FIG. 5, as* an alternative for the constraint C1 described above and summarized in Table 1, Constraint 2 can be used to determine whether a neighboring pixel should be labeled. Constraint 2 is more readily extensible to more than two dimensions. Referring to Equation 4 defining the distance difference G, most allowable pixels described by Criterion 1 yield a negative G value. However, some pixels generate a positive G value. These positive G pixels are the pixels that provide a step, from the reference pixel $P_r$, approximately parallel to the reference line. This type of growth through pixels is especially desirable around the edge of the small structure. The largest values of G are associated with diagonal pixels and occur at the edge of the smallest features to be segmented. Furthermore, among all possible pixel configurations, the value of G is maximal when the reference line angle θ is 45° or 135° and the new pixel P is diagonally connected to the referenced pixel $P_r$. This maximal value is also obtained for other homologous arrangements of the three pixels. A positive threshold $G_t$ for G can be used instead of Criterion 1. Consider an approximately circular object 2N pixels wide. On the edge of such an object, the highest value for G, called $G_{max}$, will equal $(\sqrt{(N^2+2)})-N$. The smaller N, the larger $G_{max}$ will be. An appropriate threshold for G can be set by using the width of the smallest object of interest. Therefore, an alternative way of constraining the expansion of pixels away from the local extreme is to allow only new pixels which provide a value of G of at most $G_{max}$. That is, set $G_t=G_{max}$. This threshold, $G_t$, can be considered an expansive tolerance distance. Criterion 2 can be stated as: G must be less than or equal to the expansive tolerance distance, $G_t$. For example, mammograms with pixels of 25 microns and microcalcification candidates having structures as small as 0.25 mm across, yield N=5; so, $G_t=G_{max}=0.196$.

The preferred embodiment determines 16 ray edge pixels around the object, and segments with the hill climbing procedure described. As indicated in step 270 of FIG. 2A, each appended pixel is labeled and is used as a reference pixel itself during growth. The growth stops when no pixel can be appended. Once no more new pixels can be labeled, each labeled pixel is examined to identify edge pixels of the small feature in step 275 in FIG. 2B. The edge pixels of the small feature are determined to be all labeled pixels that are four-connected to an unlabeled pixel after no further pixels can be added.

After every object has been segmented and its outer edge pixels defined, larger features may be discernable. The larger features can be constructed where the small features abut or overlap slightly. The step of joining small features together into a larger feature is depicted in step 285 of FIG. 2B. Depending on the larger feature being assembled, the criterion for joining small features can be that the small features share edge pixels, or that the edges overlap so that the edge of one small feature is an interior labeled pixel of another small feature. It is also possible that features be joined that do not touch or overlap, provided they are sufficiently close together. A tolerance called a join distance can be used to determine how close the edges should be to each other in order to combine the small features into one or more larger features. In this case, all small features are joined where the edge pixels of two different small features are within a join distance. Overlapping pixels are covered by this criterion as are features whose edge pixels coincide. By setting the joined distance to 0 the edge coincidence is required; and by setting the join distance negative, overlapping can be required.

EXAMPLES

To determine whether the results of the present invention provide edges of small features that are useful in interpreting mammograms and in doing so with fewer computations than other methods, several experiments were performed with actual mammograms. The correctness of the edge determined by the present invention is measured by its similarity to the edges determined by an analyst, and its ability to discriminate among the candidate microcalcifications in subsequent processing. Other advantages of the preferred embodiment are measured using the complexity or number of computations involved in the procedure, and the time required to execute the procedure on a computer.

Example 1

Five mammograms containing subtle microcalcification clusters were used to evaluate the algorithms for data that would warrant the use of an automated system. Mammograms without magnification were used; and the breast images covered an area that ranged between 12 cm×6 cm and 21 cm×11 cm. The location of individual microcalcifications was indicated by an experienced mammographer. These 5 mammograms contained 15 clusters with a total of 124 microcalcifications, yielding about 8 microcalcification per cluster. The number of microcalcifications per cluster ranged between 3 and 18. The size of microcalcifications ranged between 0.25 mm and 1 mm wide, with more than 90% being smaller than 0.5 mm. Mammograms were digitized with a Howtek D4000 drum scanner using a spatial resolution of 25 microns per pixel and 12-bit A/D conversion, with an optical dynamic range of 0-3.5 optical depths (O.D.).

The multi-tolerance region growing procedure grows a region around a seed pixel by appending 4-connected pixels P that satisfy:

$$(1+\tau)(F_{max}+F_{min})/2 \geqq P \geqq (1-\tau)(F_{max}+F_{min})/2 \tag{5}$$

where $\tau$ is the tolerance parameter, and $F_{max}$ and $F_{min}$ are the current maximum and minimum values in the region grown that far. The value of $\tau$ is not manually selected by the user; the best value is automatically determined for each segmented structure by repeating the growth with multiple values of $\tau$ between 0.01 and 0.4 with steps of s=1/v, where v is the 8-bit value of the seed pixel. Three features are extracted from each region grown with a different tolerance level: shape compactness, center of gravity, and size. The algorithm determines the value of $\tau$ that results in the minimal change in the vector of these three features with respect to the previous $\tau$ value in the sequence by computing a normalized difference between consecutive vectors. The vector with minimal difference indicates the best choice of $\tau$.

The segmentation outcome of the multi-tolerance region growing procedure on 5 subtle microcalcification candidates depended partly on the intensity structure of the microcalcification. When the intensity transition from the edge to the background was relatively abrupt, the segmented region coincided closely to the visually perceived edge. When the intensity at the edge decreased gradually toward the background level, this algorithm generally produced a relatively large region. Nevertheless, the growth was consistently contained, i.e. it did not grow to an unacceptable size and it generated boundaries that can be used as an estimate of the immediate background around the microcalcification.

The active contours model represents the contour points as v(s)=(x(s),y(s)) The contour is obtained by minimizing the energy functional:

$$E[v(s)] = \int_{\Omega} Eint[v(s)] + PE[v(s)] + Eext[v(s)]\,ds \tag{6}$$

where $E_{int}$ is the internal energy due to the elasticity and the rigidity, PE is the potential energy obtained from the image data, $E_{ext}$ is the energy of external forces that can be applied to the contour. The integration is performed over the entire contour $\Omega$. The internal energy is expressed by:

$$E_{int}=w_1|v'(s)|^2+w_2|v''(s)|^2 \tag{7}$$

where $w_1$ and $w_2$ are coefficients that control the elasticity and rigidity, respectively, and primes denote differentiation. The choice of potential energy depends on the application; it is typically the negative squared gradient magnitude, and is so used for mammograms.

The active contour that minimizes E(v) satisfies the Euler-Lagrange equation:

$$-(w_1v')'+(w_2v'')''=F(v) \tag{8}$$

where F(v) represents the force due to the combined effects of the potential energy and external energy. In this study we implemented the balloon forces and the image force normalization suggested, resulting in $$F(v) = k_1 n(s) - k_2 \frac{\nabla PE}{\|\nabla PE\|} \quad (9)$$

where n(s) is the unit vector normal to the contour at point v(s), oriented toward the outside of the contour, $k_1$ is the magnitude of the balloon inflation force, and $k_2$ is the coefficient of the normalized image force. The value of $k_2$ is selected to be slightly larger than $k_1$ to allow edge points to stop the inflation force.

The numerical solution was implemented using finite differences and the iterative evolution as suggested:

$$(I+\tau A)v_t=(v_{t-1}+\tau F(v_{t-1})) \quad (10)$$

where I is the identity matrix, $\tau$ is the time step, A is the pentadiagonal matrix obtained with the finite difference formulation of $E_{int}$, $v_t$ is the active contour vector at time t, and $F(v_t)$ is the external force vector at time t. We used the negative squared magnitude of the image gradient as the potential energy. Pixels detected with an edge detector were not used in this study. The gradient of the image was computed with the Sobel operator.

The initial position of the contour was set automatically for each structure to be segmented. Since each structure of interest is a local intensity extreme, pixels were selected that were local maxima across the entire image. Each local maximum was used to segment a region around it. The width of the smallest microcalcifications considered in this study was about 0.25 mm and the majority of the microcalcifications in our database had widths in the range 0.3 to 0.5 mm. A circle of 0.2 mm diameter around the local maximum pixel was used as the initial position of the active contour. The initial contour points were 248-connected pixels forming this circle.

The selection of parameters for the active contour segmentation required some trial and error to obtain good segmentation. The segmentation of the same 5 subtle microcalcification candidates was performed using different active contours parameters. First, following the recommendations of Cohen (Cohen, L. D. "On Active Contour Models and Balloons," CVGIP: Image Understanding, vol. 53, pp. 211-218, 1991), we selected the values of $w_1$ and $w_2$ as a function of the spatial discretization step size h, such that $w_1$ was of the order of $h^2$ and $w_2$ was of the order of $h^4$($w_1$=6, $w_2$=40). Then $\tau$ was also set to 0.1. When $k_1$ and $k_2$ were relatively small (2 and 4), the image force and the balloon force did not act sufficiently on the active contour, producing contours that were only slightly different than the initial position. When these two parameters were increased (14 and 16), the resulting segmentation was very close to that expected visually. Increasing these parameters further (24 and 26) increased the combined effect of image gradient and balloon forces, producing contours that extended beyond the expected edges. Within this range, segmentation with the active contour model was not very sensitive to the values of the other parameters. The effect of doubling $w_1$ to 12, is that contours became slightly smaller due to the increased stiffness of the active contour model. Sensitivity to $w_2$ was also low. When $w_2$ was doubled to 80, the contours became slightly smoother due to the increased rigidity of the model.

Figures 6A, 6B, 6C, 6D:
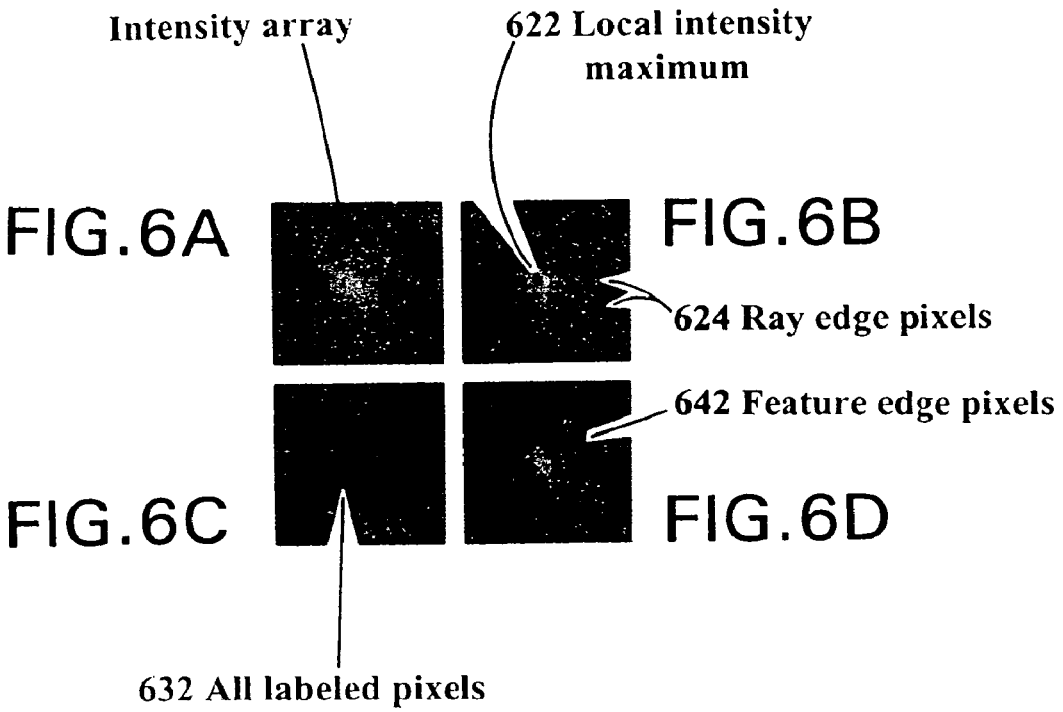
FIGS. 6A-6D are gray scale photographs showing an actual intensity maximum as originally provided and then superposed with labeled pixels after three stages of the method of FIG. 2 according to the present invention.
Figure 7A:
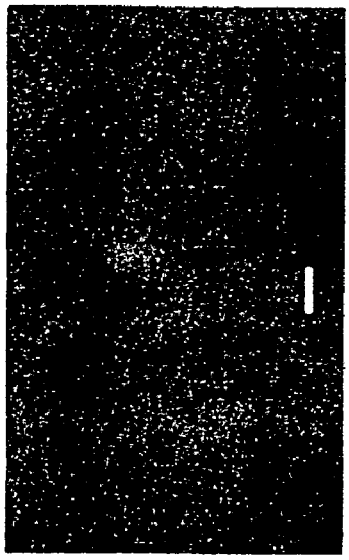
FIGS. 7A-7D are gray scale photographs showing three actual intensity maxima as originally provided and then superposed with labeled edge pixels after segmentation based on two conventional methods and the preferred embodiment of the present invention.
Figure 7B:
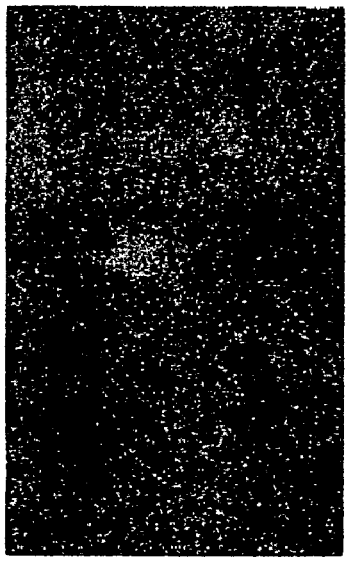
Figure 7C:
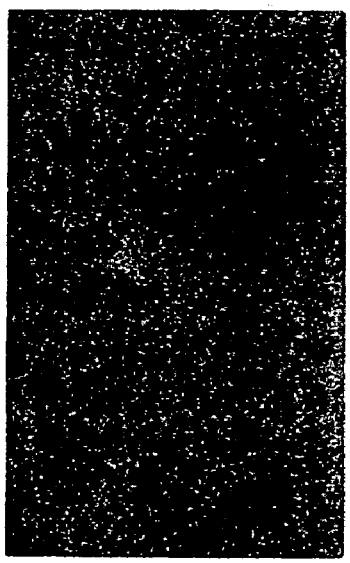
Figure 7D:
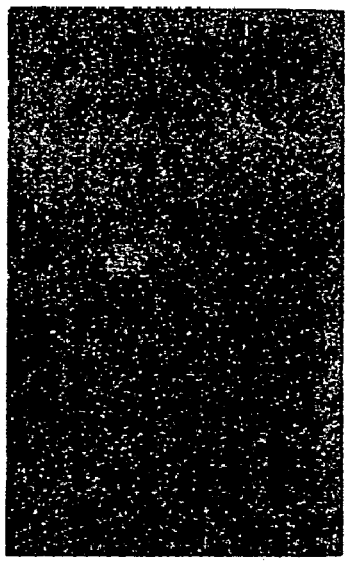
Figure 2A:
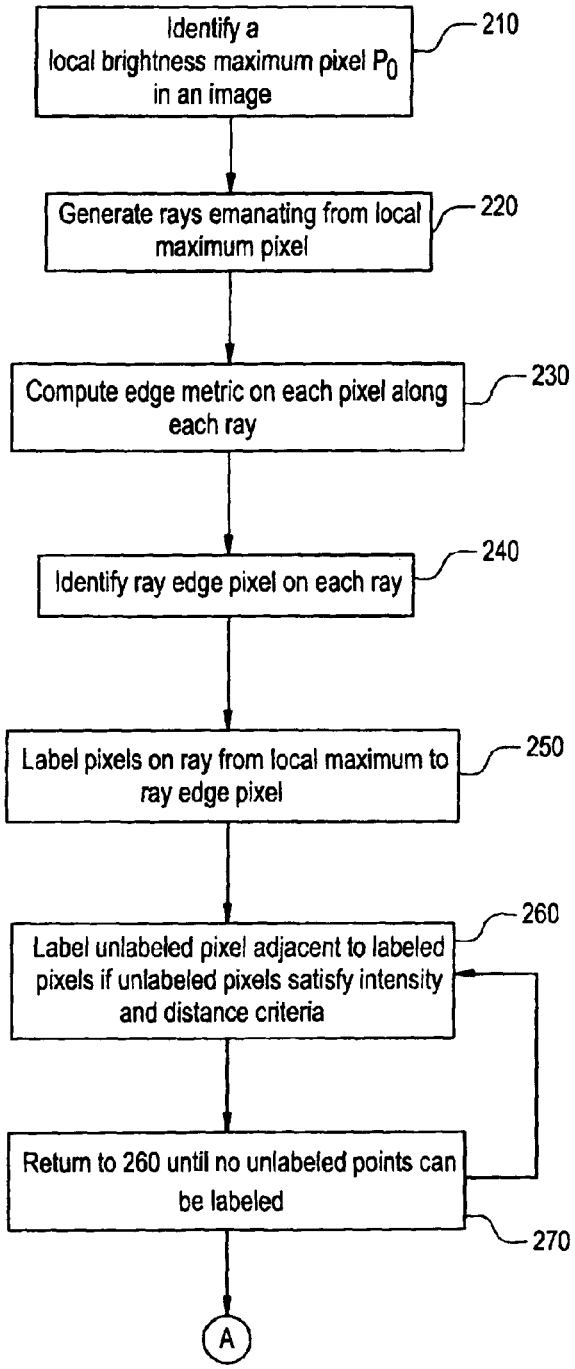

The segmentation steps of the hill climbing approach of the present invention are illustrated in FIG. 6. FIG. 6A shows a microcalcification candidate that has a width of about 0.3 mm. The 16 ray edge points 624 determined by the radial line search of the hill climbing algorithm are shown in FIG. 6B. The region grown using spatial Constraint 1 is in FIG. 6C. The region grown with spatial Constraint 2 was identical for this microcalcification candidate. The edge pixels 642 of the entire microcalcification candidate are shown in FIG. 6D. The segmentation of microcalcifications by the hill climbing method produces outcomes using the spatial Constraints 1 and 2 that were almost identical. In this study, about a quarter of microcalcifications were segmented identically by the two spatial constraints and the rest differed by a few pixels, resulting in a negligible change over the entire microcalcification. Both spatial constraints directed the growth of the regions successfully, resulting in regions that were compatible with visual interpretation.

The differences between the three methods are illustrated in FIG. 7. Three subtle microcalcifications candidates are shown in FIG. 7A. When the contrast of a microcalcification candidate was relatively low, or parts of it exhibited a very gradual decrease in intensity toward the background, the multi-tolerance algorithm (FIG. 7B) segmented a larger region than those of the other two algorithms. Good segmentation with active contours (FIG. 7C) was obtained using $w_1$=6, $w_2$=40, $\tau$=0.1, $k_1$=14 and $k_2$=16, for all microcalcifications candidates of this study. Using these parameters, segmentation with active contours provided edges 735 that were smoother than edges 725 and 745 produced by segmentation with the other two methods. The selection of $w_1$ and $w_2$ provided the flexibility needed to adapt relatively well to the shape of diverse microcalcifications candidates. The elasticity level allowed the contour to grow to the highest gradient locations when the segmented structures were relatively large, and the rigidity level allowed the contour to develop sharp bends dictated by the data in some microcalcifications. The edges 745 of regions grown by the hill climbing algorithm shown in FIG. 7D were not as smooth as those 735 of the active contours, but the convolutions were consistent with visually perceived edges around microcalcifications candidates.

Example 2

Segmentation of microcalcification candidates serves as an initial step for discriminating between the population of microcalcifications and that of background structures. The discrimination potential of each segmentation algorithm was quantified using features extracted from structures segmented around all the local maxima in the 5 mammograms. These structures consisted of the 124 microcalcifications mentioned above and 2,212 background structures segmented in the same mammograms. Four characteristics were used to assess the discrimination potential in this study.

1. Contrast was measured as the gray level difference between the local maximum pixel $P_0$ in the structure, and the mean of pixels around its edge.

2. Relative contrast was computed as the ratio of the contrast to the value at the local maximum.

3. Area was computed as the number of labeled pixels in the grown region.

4. Edge sharpness was the mean of the gradient computed with a Sobel operator across all edge pixels. The Sobel operator is a mask which weights the eight neighbors of a pixel to compute a sum proportional to the gradient x, or the y gradient, or total gradient.

The discrimination ability of each feature was determined separately using the area under a receiver operating characteristic (ROC) curve obtained with that feature. The ROC curve pots the percentage of correctly detected microcalcifications against the percentage of detected background structures as a detection threshold is changed. The ROC curve area is higher when the feature has distributions that are more separable for a given property. When both populations overlap completely, the ROC curve area is 0.5. In general, effective discrimination power is indicated by a value above 0.8. Table 2 summarizes the results for all three procedures. The area feature had very low discrimination power for all three algorithms, indicating that the two types of structures cannot be discriminated well on the basis of their area segmented. However, the other

TABLE 2

| | Multi-tolerance Region Growing | Active Contours | Hill Climbing |
|---|---|---|---|
| Contrast | 0.80 | 0.82 | 0.83 |
| Relative Contrast | 0.83 | 0.90 | 0.90 |
| Area | 0.63 | 0.60 | 0.54 |
| Sharpness | 0.80 | 0.85 | 0.85 |

three features suggested good discrimination potential for all three algorithms. A comparison among algorithms shows that both the hill climbing method of the present invention and the active contours algorithm provide segmentation with the same discrimination power, and they both perform slightly better than the multi-tolerance segmentation. Thus, the hill climbing method produces edges as good as the best produced by the conventional approaches tested.

The significant advantage of the hill climbing algorithm is its speed. While the multi-tolerance algorithm provides a good solution to avoid the use of statistical models, local statistics estimators and the manual selection of threshold, its cost is multiple segmentations of the same structure and computation of features during the segmentation of each structure. Furthermore, in some cases, this algorithm segments regions that are somewhat larger than expected. Consequently, the time required for segmentation of a mammogram with this algorithm is high. The segmented regions were comparable to those of the other two algorithms in many cases. The differences were caused by the fact that the growth mechanism of this algorithm is constrained only by an intensity range criterion applied to a new pixel. In contrast, active contours are constrained by internal forces that regulate the growth away from the local maximum, and hill climbing has an inward growth mechanism based on edge points.

The active contours also circumvent the statistical and manual threshold selection issues for each mammogram, but the selection of the operational parameters for a set of mammograms requires some trial and error. However, when an appropriate set of parameters is determined, it appears to be valid for a wide range of microcalcifications so it need not be modified with each mammogram. The choice of negative squared gradient magnitude as the image energy function seems to be an appropriate one to segment microcalcifications.

Example 3

The computational complexity $c_m$ of the multi-tolerance region growing algorithm is of the order O(4smo) where s is the number of steps in the tolerance search, m is the number of pixels in the region, and o is the number of operations per pixel. The factor 4 is included because the algorithm visits the 4-connected neighbors for each pixel in the region. Considering 125 to be an average intensity value for the local maximum, the average step size is 0.008 resulting on the average in about s=50 steps to cover the range 0.01 to 0.4. The average size of segmented structures is about 200 pixels. At each pixel the computations performed include intensity comparisons, update of $F_{max}$ and $F_{min}$, and calculation of the center of gravity. Considering about 12 operations per pixel on the average, the numerical estimate for the average number of operations per segmentations is $c_m$=480,000.

The computational complexity $c_a$ of the active contour model is $O[2(n+n^2)t]$ where n is the number of contour points, and t is the number of iterations. The factor of 2 is included due to the fact that the x and y coordinates of each contour point are computed separately, with identical operations. At each iteration, order n computations are needed to determine the normal vectors, and order $2n^2$ operations are needed to perform a matrix multiplication. In this study 24 contour points were used, and the number of iterations depended on the size of the structure. On the average however, the active contour model converged in about 20 iterations. This resulted in an average value of $c_a$=47,040, a factor of ten improvement over the multi-tolerance method.

The complexity $c_h$ of the hill climbing method is O(KN+8m) where K is the number of radial directions from the local maximum, N is the number of pixels searched in each direction, and m is the number of pixels in the grown region. A factor of 8 is included since all 8 neighbors of each pixel are visited. In this study K was 16 and N was 40, and considering an average structure size of m=200, the average estimate of the number of operations is $c_h$=2,240, a factor of 20 improvement over the active contour methods, and 200 over the multi-tolerance method. The proportions of $c_m$, $c_a$ and $c_h$ are approximately 214:21:1 respectively, with hill climbing far less complex than the other two methods.

Example 4

The speed of the different methods was compared using a section of a mammogram containing 456 local maxima, 35 of which were in microcalcifications. The sizes of microcalcifications ranged between 0.25 mm and 0.5 mm. The times to complete the segmentation of this section of mammogram using the three algorithms implemented in C on a 10 million floating point operations per second (MFLOPS), IBM 6000 computer were 17 minutes 47 seconds for the multi-tolerance algorithm, 1 minute 47 seconds for the active contours, 7 seconds for hill climbing with spatial Constraint 1, and 5.4 seconds for hill climbing with spatial constraint 2.

Hill climbing with spatial Constraints 1 and 2 yielded practically identical segmentations; but the method was about 20% faster using spatial constraint 2, resulting in 11.8 ms on average for segmenting a structure, as opposed to 15.3 ms obtained with spatial Constraint 1.

A common technique to determine the edges of an object uses an edge enhancement algorithm such as the Sobel operator, thresholding to separate the pixels on edges, and pixel linking to string edge pixels that belong to the same object. Selection of the threshold is critical, and linking poses problems in segmenting microcalcifications because there are many closely spaced small structures in a background that are likely to produce considerable numbers of edge pixels. The hill climbing method of the preferred embodiment determines edge points that are on the edge of the same object by virtue of the radial line search emanating from the same local maximum. It does not require a threshold to separate edge pixels because the slope in Equation 3 is referred to the local maximum and is greatest at pixels that are on, or very near, the visually perceived edges. Finally, the hill climbing method avoids some pitfalls of the region growing mechanism by growing a region inward, toward the local maximum.

There has been disclosed a segmentation method and apparatus for data arranged in a multidimensional array which overcomes the problems of the prior art. Although the present invention has been described above by way of detailed embodiments thereof, it is clearly understood that variations and modifications may be made by one of ordinary skill in the art and still lie within the spirit and scope of the invention as defined by the appended claims and their equivalents.

What is claimed is:

[1. A method for segmenting a small feature in a multidimensional digital array of intensity values in a data processor, the method comprising:

computing an edge metric along each ray of a plurality of multidimensional rays originating at a local intensity extreme;

identifying a multidimensional edge point corresponding to a maximum edge metric on each said ray;

labeling every point on each said ray from said local extreme to said edge point; and labeling an unlabeled point if the unlabeled point is adjacent to a labeled point and the unlabeled paint has a more extreme intensity than the labeled point and the unlabeled point is closer than the labeled point to the local extreme.]

[2. The method of claim 1 wherein intensity is a vector of values and an edge metric is a magnitude of a vector difference in intensities between two points along each said ray divided by a multidimensional distance between the same two points.]

[3. The method of claim 1 further comprising additionally labeling an unlabeled point if the unlabeled point is adjacent to a labeled point and has a more extreme intensity than the labeled point and is no farther from the local extreme than the sum of a distance from the labeled point to the local extreme plus an expansive tolerance distance less than the spacing between adjacent points.]

[4. The method of claim 1 further comprising also labeling an unlabeled point if the unlabeled point is adjacent to a labeled point and the unlabeled point has a less extreme intensity than the labeled point and the unlabeled point is closer than the labeled point to the local extreme by an inclusion tolerance distance.]

[5. The method of claim 4, wherein the inclusion tolerance distance is about a spacing distance between adjacent points in the array or more.]

[6. The method of claim 1, wherein the edge metric at a ray point along each ray is computed as the quotient of the absolute value of an intensity difference between the local extreme and the ray point divided by the absolute value of a distance between the ray point and the local extreme.]

[7. The method of claim 1, wherein a ray length of each said ray is scaled by an expected size of a small feature.]

[8. The method of claim 1, wherein the local intensity extreme is a point with the maximum intensity among a subarray of the multidimensional digital array of intensity values, the subarray having a certain multidimensional size, and the intensity of the local intensity extreme exceeds a bright threshold intensity.]

[9. The method of claim 8, wherein the certain multidimensional size is an expected size of a small feature.]

[10. The method of claim 1, wherein the local intensity extreme is a point with the minimum intensity among a subarray of the multidimensional digital array of intensity values, the subarray having a certain multidimensional size, and the intensity of the local intensity extreme is less than a dark threshold intensity.]

[11. The method of claim 10, wherein the certain multidimensional size is an expected size of a small feature.]

[12. The method of claim 1, wherein the multidimensional array is a digital image, and each point is a pixel.]

[13. The method of claim 12, wherein the digital image is a digitized mammogram and the small feature is a microcalcification candidate.]

[14. The method of claim 12, wherein the digital image is a video frame of a military scene and the small feature is a candidate target of a tiring system.]

[15. The method of claim 1, wherein said labeling continues until no further unlabeled point can be labeled.]

[16. The method of claim 15, further comprising relabeling a labeled point as a feature edge point if an adjacent point is an unlabeled point.]

[17. The method of claim 16, further comprising joining a plurality of small features into a composite feature when a feature edge point from one small feature of the plurality of small features is within a join distance of a feature edge point of another small feature of the plurality of small features.]

[18. A method for segmenting a small feature in a multidimensional digital array of intensity values in a dataprocessor, the method comprising:

computing an edge metric along each ray of plurality of multidimensional rays originating at a local intensity extreme:

identifying a multidimensional edge point corresponding to a maximum edge metric on each said ray:

labeling every point on each said ray from said local extreme to said edge point;

labeling an unlabeled point if the unlabeled point is adjacent to a Labeled point and the unlabeled point has a more extreme intensity than the labeled point and the unlabeled point is closer than the labeled point to the local extreme: and additionally labeling an unlabeled point if the unlabeled point is adjacent to a labeled point and has a more extreme intensity than the labeled point and is no farther from the local extreme than the sum of a distance from the labeled point to the local extreme plus an expansive tolerance distance less than the spacing between adjacent points; wherein an expected size of a small feature is twice an integral number N times a spacing distance between adjacent points in the array, N is greater than 1, the maximum value of the difference in distances between the labeled point and the unlabeled point to the local extreme (Gmax)$=-N+\sqrt{(N^2+2)}$, and the expansive tolerance distance is less than about Gmax.]

[19. A data processing apparatus for segmenting a small feature in a multidimensional digital array of intensity values comprising:

an input for a plurality of intensity values arranged along regular increments in each of a plurality of dimensions;

a memory medium for storing the plurality of intensity values as a multidimensional digital array;

a processor configured to detect a local intensity extreme in the multidimensional digital array, to identify points along a plurality of rays originating at the total intensity extreme, to identify one edge point on each ray of said plurality of rays, said edge point associated with a maximum edge metric along said ray, to label each point on each ray from the local intensity extreme to the edge point, and to label an unlabeled point adjacent to a labeled point if the unlabeled point has a more extreme intensity than the labeled point and the unlabeled point is closer than the labeled point to the local extreme until no more unlabeled points can be labeled; and an output for providing the labeled points for subsequent processing.]

[20. The apparatus of claim 19, wherein the plurality of intensity values arranged along regular increments in each of a plurality of dimensions is at least one digital image, and each point is a pixel.]

[21. The apparatus of claim 20, wherein the digital image is a digitized mammogram and the small feature is a microcalcification candidate.]

[22. A computer program embodied in a computer readable medium for performing the steps of:

computing an edge metric along each ray of a plurality of multidimensional rays originating at a local intensity extreme, identifying a multidimensional edge point corresponding to a maximum edge metric on each said ray, labeling every point on each said ray from said local extreme to said edge point, and labeling an unlabeled point if the unlabeled point is adjacent to a labeled point and the unlabeled point has a more extreme intensity than the labeled point and the unlabeled point is closer than the labeled point to the local extreme.]

*23. A method of labeling points of a multi-dimensional array so as to designate portions of the multi-dimensional array that are associated with an object, the method comprising:*

*identifying a first point as belonging to an object due to the first point having an intensity that is a local intensity extreme, wherein the first point is at an interior of the object;*

*determining that a second point that is distanced from the first point has a maximum edge metric, wherein the second point has an intensity that is smaller in magnitude than the intensity of the first point;*

*labeling the second point as an edge point that lies on an edge of the object;*

*determining that a third point that is adjacent to the second point satisfies a predetermined criterion relative to one or more of the first and second points; and*

*labeling the third point as belonging to the object.*

*24. The method of claim 23, wherein the intensity of the first point is greater than the intensities of all points immediately adjacent to the first point.*

*25. The method of claim 23, wherein the intensity of the first point is less than the intensities of all points immediately adjacent to the first point.*

*26. The method of claim 23, wherein the edge metric comprises a slope quotient that compares a difference between intensities of the first point and a point that is being evaluated to a distance between the first point and the point that is being evaluated.*

*27. The method of claim 23, wherein the predetermined criterion comprises the third point being disposed along a substantially straight line between the first and second points.*

*28. The method of claim 23, wherein the predetermined criterion comprises:*

*an intensity of the third point being less than an intensity of the second point; and*

*a distance between the first and third points being smaller than a distance between the first and second points by no less than an inclusion tolerance distance.*

*29. The method of claim 23 wherein the predetermined criterion comprises an intensity of the third point being greater than an intensity of the second point.*

*30. The method of claim 23 wherein the predetermined criterion comprises:*

*an intensity of the third point being no less than an intensity of the second point; and*

*the third point being closer to the first point than the second point is to the first point.*

*31. The method of claim 23 wherein the predetermined criterion comprises:*

*an intensity of the third point being no greater than an intensity of the second point; and*

*the third point being closer to the first point than the second point is to the first point.*

*32. The method of claim 23 wherein the predetermined criterion comprises:*

*an intensity of the third point being no less than an intensity of the second point; and*

*a distance between the first and third points being no more than an expansive tolerance distance greater than a distance between the first and second points.*

*33. The method of claim 23 wherein the predetermined criterion comprises:*

*an intensity of the third point being no greater than an intensity of the second point; and*

*a distance between the first and third points being no more than an expansive tolerance distance greater than a distance between the first and second points.*

*34. The method of claim 23 wherein the predetermined criterion comprises:*

*an intensity of the third point being no less than an intensity of the second point; and*

*no less than an inclusion portion of the third point being on a side of a substantially straight inclusion line closest to the first point, the inclusion line intersecting the second point and being substantially perpendicular to a substantially straight line that intersects the first and second points.*

*35. The method of claim 23 wherein the predetermined criterion comprises:*

*an intensity of the third point being no greater than an intensity of the second point; and*

*no less than an inclusion portion of the third point being on a side of a substantially straight inclusion line closest to the first point, the inclusion line intersecting the second point and being substantially perpendicular to a substantially straight line that intersects the first and second points.*

*36. The method of claim 23, further comprising identifying as part of the edge of the object a fourth point that is immediately adjacent to at least one point that is identified as part of the object and that is immediately adjacent to at least four other points that are outside of the object.*

*37. A non-transitory computer-readable medium having instructions stored thereon, the instructions comprising:*

*instructions for identifying a first point as belonging to an object due to the first point having an intensity that is a local intensity extreme, wherein the first point is at an interior of the object;*

*instructions for determining that a second point that is distanced from the first point has a maximum edge metric, wherein the second point has an intensity that is smaller in magnitude than the intensity of the first point;*

*instructions for labeling the second point as an edge point that lies on an edge of the object;*

*instructions for determining that a third point that is adjacent to the second point satisfies a predetermined criterion relative to one or more of the first and second points; and*

*instructions for labeling the third point as belonging to the object.*

*38. The non-transitory computer-readable medium of claim 37, wherein the predetermined criterion comprises:*

*an intensity of the third point being less than an intensity of the second point; and*

*a distance between the first and third points being smaller than a distance between the first and second points by no less than an inclusion tolerance distance.*

*39. The non-transitory computer-readable medium of claim 37, wherein the predetermined criterion comprises:*

*an intensity of the third point being no less than an intensity of the second point; and*

*a distance between the first and third points being no more than an expansive tolerance distance greater than a distance between the first and second points.*

*40. A data processing apparatus comprising:*

*an input for a plurality of intensity values arranged along regular increments in each of a plurality of dimensions;*

*a memory medium for storing the plurality of intensity values as a multidimensional digital array; and*

*a processor configured to:*

*identify a first point as belonging to an object due to the first point having an intensity that is a local intensity extreme, wherein the first point is at an interior of the object;*

*determine that a second point that is distanced from the first point has a maximum edge metric, wherein the second point has an intensity that is smaller in magnitude than the intensity of the first point;*

*label the second point as an edge point that lies on an edge of the object;*

*determine that a third point that is adjacent to the second point satisfies a predetermined criterion relative to one or more of the first and second points; and*

*label the third point as belonging to the object.*

*41. The data processing apparatus of claim 40, wherein the edge metric comprises a slope quotient that compares a difference between intensities of the first point and a point that is being evaluated to a distance between the first point and the point that is being evaluated.*

*42. The data processing apparatus of claim 40, wherein the predetermined criterion comprises the third point being disposed along a substantially straight line between the first and second points.*

* * * * *

UNITED STATES PATENT AND TRADEMARK OFFICE

CERTIFICATE OF CORRECTION

PATENT NO. : RE43,894 E
APPLICATION NO. : 13/314021
DATED : January 1, 2013
INVENTOR(S) : Bankman et al.

It is certified that error appears in the above-identified patent and that said Letters Patent is hereby corrected as shown below:

The title page showing the illustrative figure should be deleted to be replaced with the attached title page.

On the Title Page, Item (75), under "Inventors", in Column 1, Line 2, delete "South Riding, VA" and insert -- Chantilly, VA --, therefor.

In the Drawings,

Drawing sheet, consisting of Fig. 2A, should be deleted to be replaced with the drawing sheet, consisting of Fig. 2A, as shown on the attached pages.

In Fig. 1B, Sheet 1 of 11, delete Tag "163" and insert Tag -- 165 --, therefor.

In Fig. 1D, Sheet 2 of 11, delete Tag "100" and insert Tag -- 110 --, therefor.

In Fig. 2C, Sheet 5 of 11, Tag "262", in Line 3, delete "Pr?" and insert -- $P_r$? --, therefor.

In Fig. 2C, Sheet 5 of 11, delete "*G=d(P0, P)-d(P0, Pr)" and insert -- *G=d($P_0$, P)-d($P_0$, $P_r$) --, therefor.

In Fig. 2C, Sheet 5 of 11, delete "maximum P0" and insert -- maximum $P_0$ --, therefor.

In Fig. 2C, Sheet 5 of 11, delete "point Pr" and insert -- point $P_r$ --, therefor.

In Fig. 2C, Sheet 5 of 11, delete main designator "260a" and insert main designator -- 260 --, therefor.

In Fig. 2D, Sheet 6 of 11, Tag "262", in Line 3, delete "Pr?" and insert -- $P_r$? --, therefor.

Signed and Sealed this
Eleventh Day of November, 2014

Michelle K. Lee

Michelle K. Lee
*Deputy Director of the United States Patent and Trademark Office*

In Fig. 2D, Sheet 6 of 11, delete "*G=d(P0, P)-d(P0, Pr)" and insert -- *G=d($P_0$, P)-d($P_0$, $P_r$) --, therefor.

In Fig. 2D, Sheet 6 of 11, delete "maximum P0" and insert -- maximum $P_0$ --, therefor.

In Fig. 2D, Sheet 6 of 11, delete "point Pr" and insert -- point $P_r$ --, therefor.

In Fig. 2D, Sheet 6 of 11, delete main designator "260b" and insert main designator -- 260 --, therefor.

In the Specification,

In Column 3, Line 38, delete "Gaussinan" and insert -- Gaussian --, therefor.

In Column 6, Line 15, delete "FIG. 2." and insert -- FIG. 2A. --, therefor.

In Column 6, Line 18, delete "FIG. 2." and insert -- FIG. 2A. --, therefor.

In Column 6, Line 21, delete "FIG. 2." and insert -- FIG. 2A. --, therefor.

In Column 12, Lines 4-5, delete "FIG. 2C and step 264a" and insert -- FIG. 2C, in step 264a --, therefor.

In Column 12, Line 20, in Table 1, delete "xr" and insert -- $x_r$ --, therefor.

In Column 12, Line 20, in Table 1, delete "yr" and insert -- $y_r$ --, therefor.

In Column 14, Line 46, Equation (6), delete "$E[v(s)] = \int_{\Omega} Eint[v(s)] + PE[v(s)] + Eext[v(s)]\, ds$" and insert -- $E[v(s)] = \int_{\Omega} E_{int}[v(s)] + PE[v(s)] + E_{ext}[v(s)]\, ds$ --, therefor.

In Column 15, Line 37, delete "248-connected" and insert -- 24 8-connected --, therefor.

In the Claims,

In Column 19, Line 24, in Claim 1, delete "paint" and insert -- point --, therefor.

In Column 20, Line 14, in Claim 14, delete "tiring" and insert -- firing --, therefor.

In Column 20, Line 26, in Claim 18, delete "dataprocessor," and insert -- data processor, --, therefor.

In Column 20, Line 28, in Claim 18, delete "ray of plurality" and insert -- ray of a plurality --, therefor.

In Column 20, Line 30, in Claim 18, delete "extreme:" and insert -- extreme; --, therefor.

In Column 20, Line 32, in Claim 18, delete "ray:" and insert -- ray; --, therefor.

In Column 20, Line 36, in Claim 18, delete "Labeled" and insert -- labeled --, therefor.

In Column 20, Line 39, in Claim 18, delete "extreme: and" and insert -- extreme; and --, therefor.

In Column 20, Line 54, in Claim 18, delete "$(\mathrm{Gmax})=-N+\sqrt{(N^2+2)}$," and insert -- $(G_{max})=-N+\sqrt{(N^2+2)}$, --, therefor.

In Column 20, Line 55, in Claim 18, delete "Gmax." and insert -- $G_{max}$. --, therefor.

In Column 20, Line 65, in Claim 19, delete "total intensity" and insert -- local intensity --, therefor.

(19) United States
(12) Reissued Patent
Bankman et al.

(10) Patent Number: US RE43,894 E
(45) Date of Reissued Patent: Jan. 1, 2013

(54) METHOD AND APPARATUS FOR SEGMENTING SMALL STRUCTURES IN IMAGES

(75) Inventors: Isaac N. Bankman, Clarksville, MD (US); Tanya Nizialek, South Riding, VA (US)

(73) Assignee: The Johns Hopkins University, Baltimore, MD (US)

(21) Appl. No.: 13/314,021

(22) Filed: Dec. 7, 2011

Related U.S. Patent Documents

Reissue of:
(64) Patent No.: 7,106,893
Issued: Sep. 12, 2006
Appl. No.: 10/716,797
Filed: Nov. 18, 2003

U.S. Applications:
(63) Continuation of application No. 12/210,107, filed on Sep. 12, 2008, now Pat. No. Re. 43,152, which is a continuation of application No. 09/305,016, filed on May 4, 1999, now abandoned, application No. 13/314,021, which is a continuation of application No. 09/305,016.

(60) Provisional application No. 60/084,125, filed on May 4, 1998.

(51) Int. Cl.
*G06K 9/00* (2006.01)
*G06K 9/34* (2006.01)

(52) U.S. Cl. ..... 382/128; 382/164; 382/173; 382/177

(58) Field of Classification Search ..... 382/128, 382/129, 130, 131, 132, 133, 134, 164, 171, 382/173, 177, 179; 378/37, 62, 90, 92, 98.4, 378/98.6, 98.9; 600/300, 407, 410, 516; 128/916, 920, 922
See application file for complete search history.

(56) References Cited

U.S. PATENT DOCUMENTS 4,618,989 A 10/1986 Tsukune et al.
4,948,974 A 8/1990 Nelson et al.

(Continued)

FOREIGN PATENT DOCUMENTS

WO WO 99/57683 11/1999

OTHER PUBLICATIONS

International Search Report for International patent Application No. PCT/US99/09734; US Patent Office Oct. 18, 1999.

(Continued)

*Primary Examiner* — Abolfazl Tabatabai

(57) ABSTRACT

A method for segmenting a small feature in a multidimensional digital array of intensity values in a data processor computes an edge metric along each ray of a plurality of multidimensional rays originating at a local intensity extreme (local maximum or minimum). A multidimensional point corresponding to a maximum edge metric on each said ray is identified as a ray edge point. Every point on each ray from the local extreme to the ray edge point is labeled as part of the small object. Further points on the feature are grown by labeling an unlabeled point if the unlabeled point is adjacent to a labeled point, and the unlabeled point has a more extreme intensity than the labeled point, and the unlabeled point is closer than the labeled point to the local extreme. The resulting segmentation is quick, and identifies boundaries of small features analogous to boundaries identified by human analysts, and does not require statistical parameterizations or thresholds manually determined by a user.

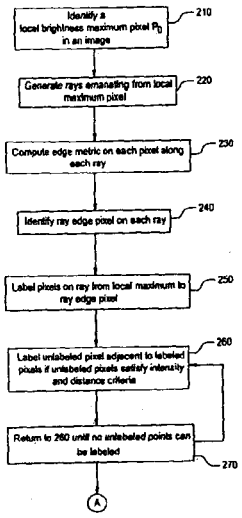

20 Claims, 11 Drawing Sheets